United States Patent
Mizuno et al.

(10) Patent No.: US 10,875,597 B2
(45) Date of Patent: Dec. 29, 2020

(54) VEHICLE WITH LEAN MECHANISM

(71) Applicant: EQUOS RESEARCH CO., LTD., Tokyo (JP)

(72) Inventors: Akira Mizuno, Tokyo (JP); Keizo Araki, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 116 days.

(21) Appl. No.: 15/762,887

(22) PCT Filed: Aug. 28, 2017

(86) PCT No.: PCT/JP2017/030757
§ 371 (c)(1),
(2) Date: Mar. 23, 2018

(87) PCT Pub. No.: WO2018/043409
PCT Pub. Date: Mar. 8, 2018

(65) Prior Publication Data
US 2018/0281886 A1     Oct. 4, 2018

(30) Foreign Application Priority Data

Aug. 29, 2016   (JP) ................................ 2016-166679

(51) Int. Cl.
*B62K 5/10*        (2013.01)
*B60W 40/112*      (2012.01)
(Continued)

(52) U.S. Cl.
CPC ............ *B62K 5/10* (2013.01); *B60G 17/0163* (2013.01); *B60W 30/045* (2013.01);
(Continued)

(58) Field of Classification Search
CPC .... B62K 5/027; B62K 5/10; B62K 2005/001; B62K 2207/02; B60G 17/0163;
(Continued)

(56) References Cited

U.S. PATENT DOCUMENTS 6,328,125 B1 * 12/2001 Van Den Brink ....... B62K 5/10
                                                    180/211
8,123,240 B2 *  2/2012 Mercier .................. B62D 9/02
                                                    280/124.103
(Continued)

FOREIGN PATENT DOCUMENTS

JP    2011-042181 A    3/2011
JP    2011-046273 A    3/2011
(Continued)

OTHER PUBLICATIONS

Mar. 5, 2019 Office Action issued in Japanese Patent Application No. 2016-166679.

(Continued)

*Primary Examiner* — Laura Freedman
(74) *Attorney, Agent, or Firm* — Oliff PLC

(57) ABSTRACT

A vehicle includes: a vehicle body; three or more wheels; an operation input unit to be operated to input a turning direction; and a lean mechanism for leaning the vehicle body in its width direction. Within at least partial range of vehicle velocity, the vehicle is configured to travel in a mode in which the vehicle body is leaned by the lean mechanism according to an input into the operation input unit, and a steering angle of a steered wheel changes following a lean of the vehicle body. And, the vehicle includes a changing device for changing a turn resistance force acting between the vehicle body and the steered wheel.

2 Claims, 17 Drawing Sheets

(51) Int. Cl.
  *B60W 30/045* (2012.01)
  *B62K 5/027* (2013.01)
  *B62D 6/00* (2006.01)
  *B60G 17/016* (2006.01)
  *B62D 9/02* (2006.01)
  *B62K 5/00* (2013.01)
  *B62J 45/415* (2020.01)

(52) U.S. Cl.
  CPC .............. *B60W 40/112* (2013.01); *B62D 6/00* (2013.01); *B62D 9/02* (2013.01); *B62K 5/027* (2013.01); *B60G 2204/421* (2013.01); *B60G 2300/122* (2013.01); *B60G 2300/13* (2013.01); *B60G 2300/45* (2013.01); *B60G 2800/0124* (2013.01); *B60G 2800/24* (2013.01); *B62D 6/005* (2013.01); *B62J 45/4151* (2020.02); *B62K 2005/001* (2013.01)

(58) Field of Classification Search
  CPC .......... B60G 2300/122; B60G 2300/13; B60G 2300/45; B60G 2800/0124; B60G 2800/24; B60G 2204/421; B62D 6/00; B62D 6/005; B62D 9/02; B60W 30/045; B60W 40/112; B62J 45/4151
  See application file for complete search history.

(56) References Cited

U.S. PATENT DOCUMENTS

| | | | | |
|---|---|---|---|---|
| 8,251,375 | B2* | 8/2012 | Hara ................... | B62D 9/02 280/5.506 |
| 8,831,833 | B2* | 9/2014 | Hayashi ............... | B60G 17/015 701/42 |
| 8,997,911 | B2* | 4/2015 | Hayashi ............... | B60G 17/015 180/210 |
| 9,037,347 | B2* | 5/2015 | Hayashi ............... | B60G 17/015 313/146 |
| 9,381,785 | B2* | 7/2016 | Gale .................. | F16F 9/22 |
| 9,616,922 | B2* | 4/2017 | Suzuki ................ | B60G 3/145 |
| 10,040,478 | B2* | 8/2018 | Horiguchi ............ | B62K 5/08 |
| 2008/0238005 | A1* | 10/2008 | James ................. | B62D 9/02 280/5.509 |
| 2018/0148118 | A1* | 5/2018 | Horiguchi ............ | B62K 5/02 |
| 2018/0265156 | A1* | 9/2018 | Hara .................. | B62D 5/046 |
| 2018/0290684 | A1* | 10/2018 | Suda .................. | B62D 9/04 |

FOREIGN PATENT DOCUMENTS

| | | |
|---|---|---|
| JP | 2013-023017 A | 2/2013 |
| JP | 2013-071691 A | 4/2013 |
| JP | 2014-069673 A | 4/2014 |
| WO | 2005/075278 A1 | 8/2005 |
| WO | 2011/083335 A2 | 7/2011 |

OTHER PUBLICATIONS

Nov. 28, 2017 Search Report issued in International Patent Application No. PCT/JP2017/030757.
Nov. 28, 2017 Written Opinion issued in International Patent Application No. PCT/JP2017/030757.
Apr. 13, 2018 Third Party Observation issued in International Patent Application No. PCT/JP2017/030757.
Mar. 19, 2020 Extended European Search Report issued in European Patent Application No. 17 84 6414.
Mar. 23, 2020 Search Report issued in Chinese Patent Application No. 20107800031891.
Mar. 30, 2020 Office Action issued in Chinese Patent Application No. 2017800031891.

* cited by examiner

Fig. 10
(A)
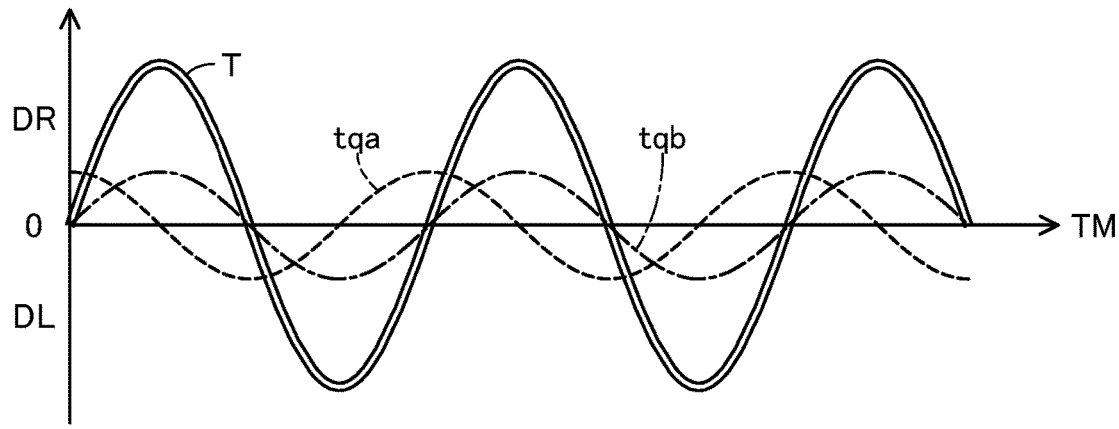
(B)
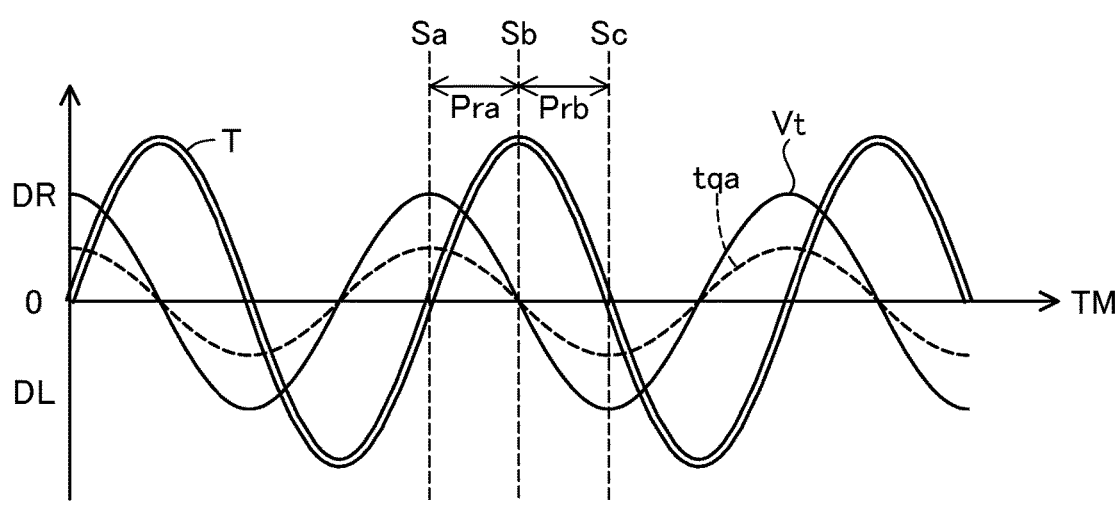
(C)
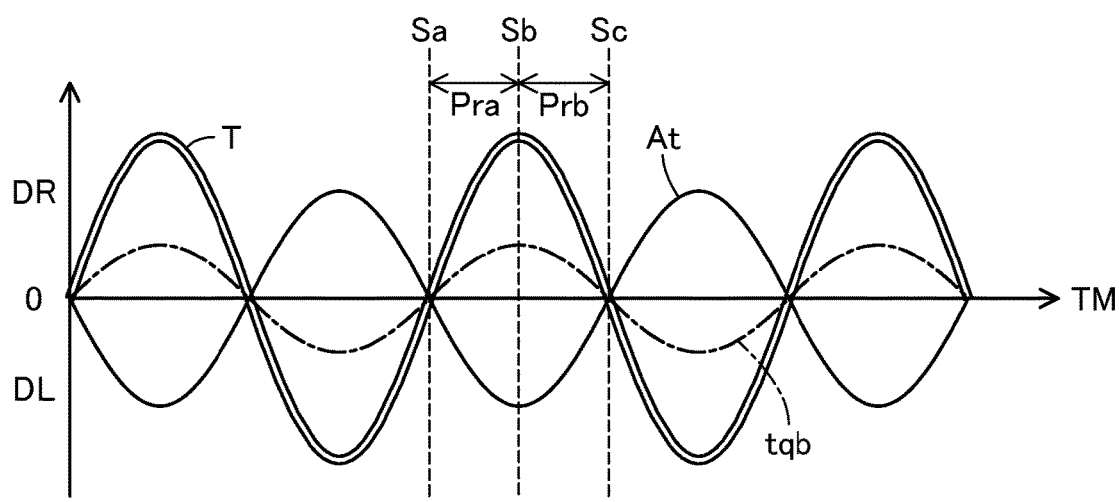

VEHICLE WITH LEAN MECHANISM

TECHNICAL FIELD

This specification relates to a vehicle which turns by leaning its vehicle body.

BACKGROUND ART

Vehicles which lean during turning have been proposed. For example, a technique was proposed where a front wheel moves freely in a caster fashion, and a vehicle body is leaned to a direction specified by a direction to which a driver moves a control device.

PRIOR ART DOCUMENT

Patent Document

Patent Document 1 WO 2011/083335

SUMMARY OF THE INVENTION

Problems to be Solved by the Invention

However, driving stability of such a vehicle may decrease due to a change in direction of a wheel. For example, driving stability of the vehicle may decrease due to a change in direction of the wheel which is inappropriate for a lean of the vehicle body.

This specification discloses a technique which can suppress deterioration in driving stability.

Means for Solving the Problems

For example, this specification discloses the following application examples.

Application Example 1

A vehicle comprising:
a vehicle body;
three or more wheels including a pair of wheels spaced apart from each other in a width direction of the vehicle and a steered wheel constituted by the pair of wheels or another wheel, the steered wheel being turnable to right and left relative to the vehicle body, the steered wheel being configured so that an intersection point between turning axis of the steered wheel and a ground is located in front of a center of contact surface between the steered wheel and the ground;
an operation input unit to be operated to input a turning direction; and
a lean mechanism for leaning the vehicle body in the width direction,
wherein within at least partial range of vehicle velocity, the vehicle is configured to travel in a mode in which the vehicle body is leaned by the lean mechanism according to an input into the operation input unit, and a steering angle of the steered wheel changes following a lean of the vehicle body, and
the vehicle comprises a changing device for changing a turn resistance force acting between the vehicle body and the steered wheel.

According to this configuration, it is possible to control a change in the steering angle by changing the turn resistance force, and thus it is possible to suppress deterioration in driving stability of the vehicle due to a change in the steering angle.

Application Example 2

The vehicle of Application Example 1,
wherein when a vehicle velocity is higher, the changing device makes the turn resistance force larger than that when the vehicle velocity is lower.

According to this configuration, when the vehicle velocity is higher, changing of the steering angle is prevented from preceding leaning of the vehicle body, and thus it is possible to suppress deterioration in driving stability of the vehicle at higher vehicle velocity.

Application Example 3

The vehicle of Application Example 1 or 2,
wherein when an angular velocity at which the lean mechanism leans the vehicle body is higher, the changing device makes the turn resistance force larger than that when the angular velocity is lower.

According to this configuration, when the angular velocity of leaning of the vehicle body is higher, changing of the steering angle is prevented from preceding leaning of the vehicle body, and thus it is possible to suppress deterioration in driving stability of the vehicle at higher angular velocity.

It should be noted that the techniques disclosed in this specification can be realized in a variety of aspects, for example, a vehicle, a vehicle controller, a vehicle control method, etc.

BRIEF DESCRIPTION OF THE DRAWINGS

FIG. 10(A)-10(C) are graphs illustrating the oscillation of the lean angle T and a torque acting on the front wheel 12F.

DESCRIPTION OF EMBODIMENTS

A. Embodiment

Figure 1:
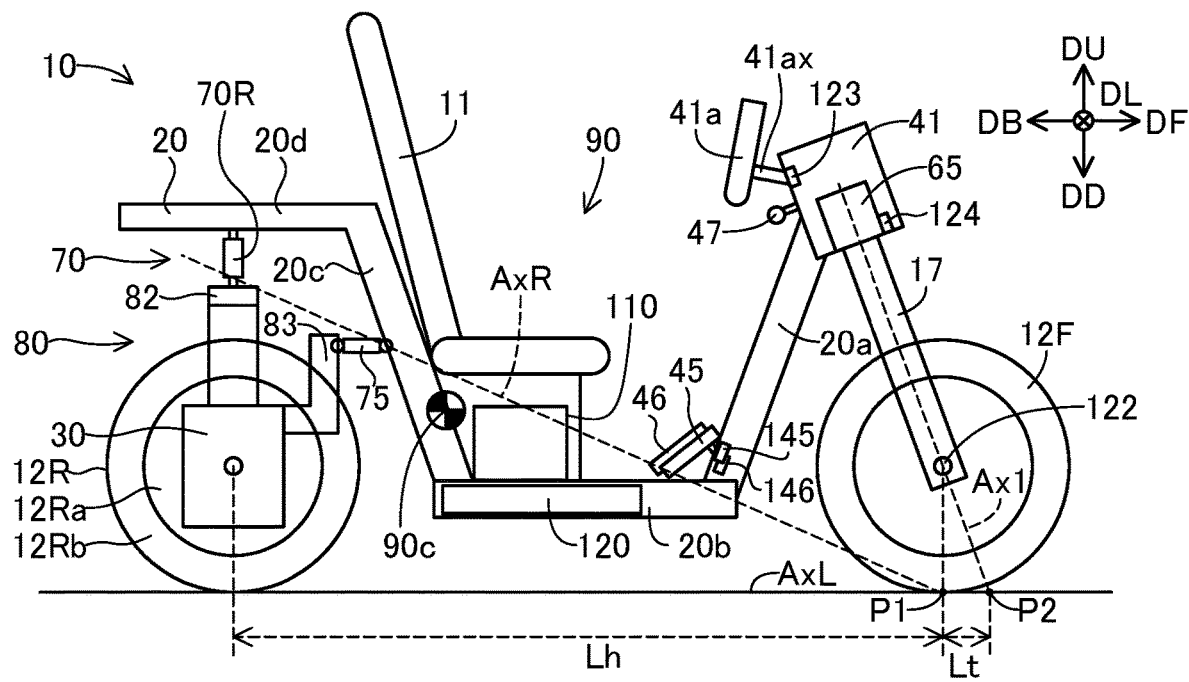
FIG. 1 is an explanatory diagram showing the vehicle 10.
Figure 2:
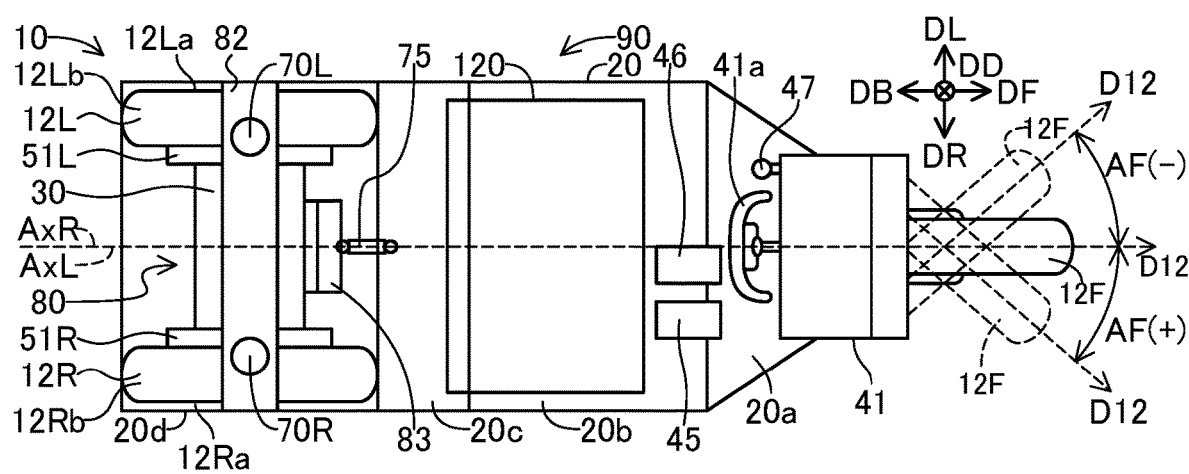
FIG. 2 is an explanatory diagram showing the vehicle 10.
Figure 3:
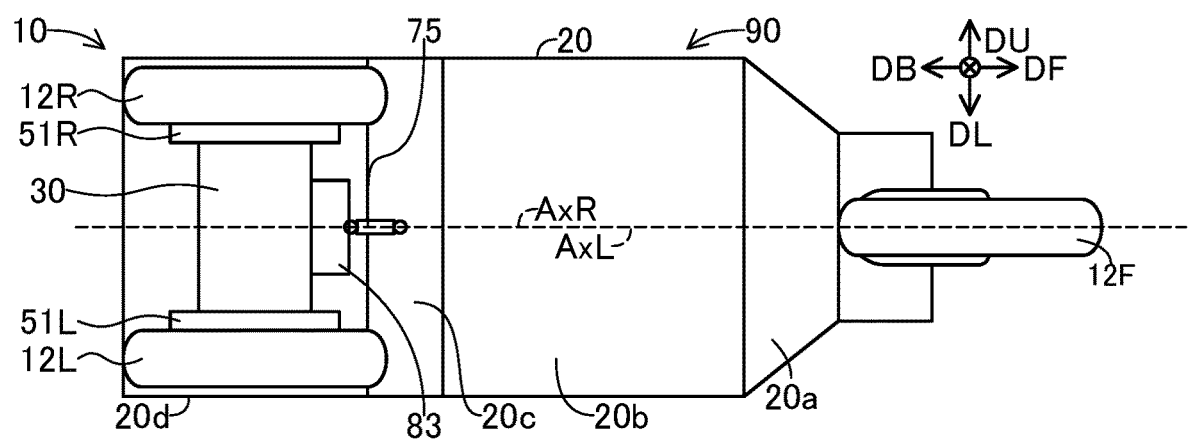
FIG. 3 is an explanatory diagram showing the vehicle 10.
Figure 4:
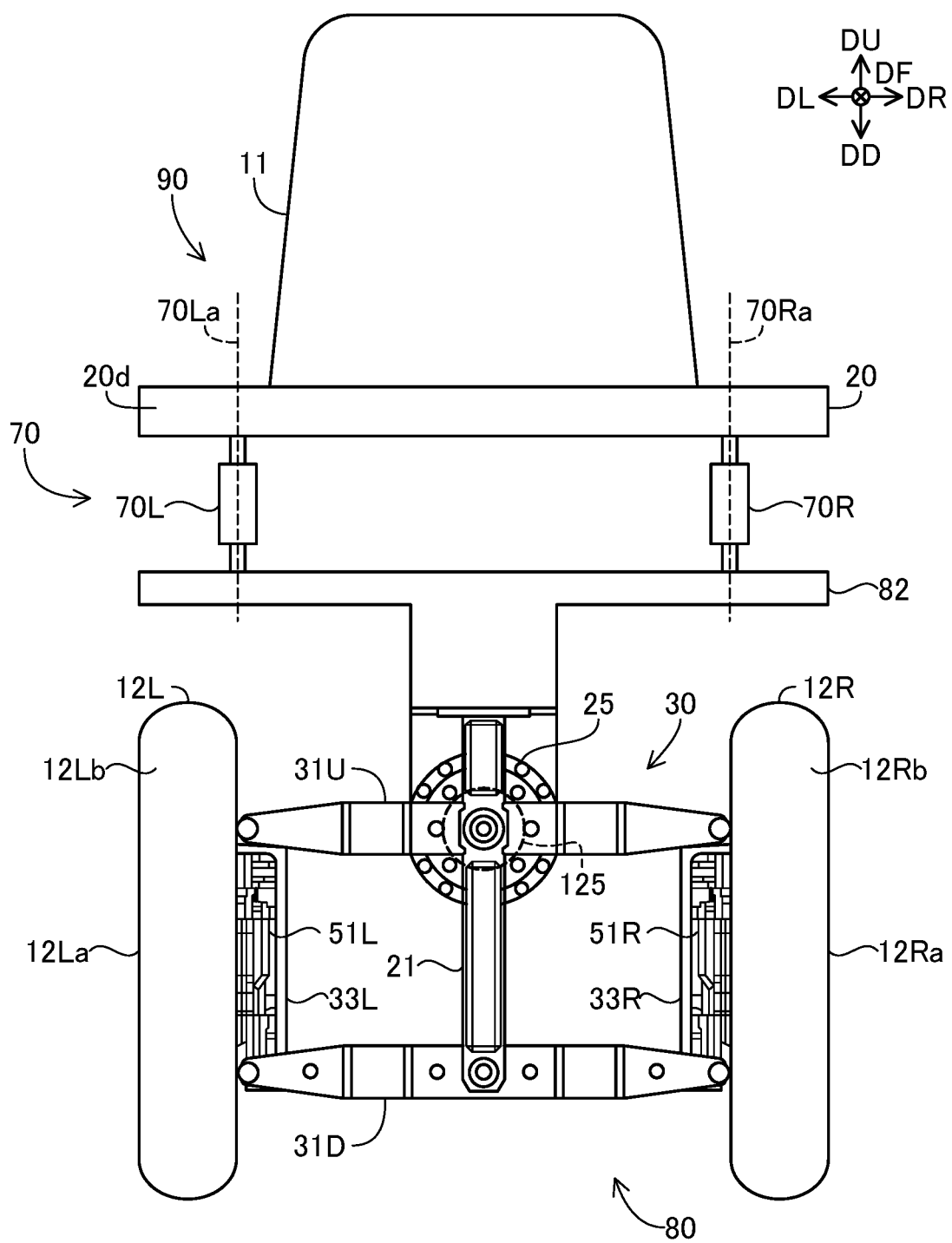
FIG. 4 is an explanatory diagram showing the vehicle 10.

FIGS. 1-4 are explanatory diagrams which show a vehicle 10 as one embodiment. FIG. 1 shows a right side view of the vehicle 10, FIG. 2 shows a top view of the vehicle 10, FIG. 3 shows a bottom view of the vehicle 10, and FIG. 4 shows a rear view of the vehicle 10. In FIGS. 2-4, only the components for use in illustration are shown that are included in the vehicle 10 configuration shown in FIG. 1, and the remaining components are omitted. In FIGS. 1-4, six directions DF, DB, DU, DD, DR, and DL are shown. The front direction DF is a direction of forward movement of the vehicle 10, and the back direction DB is opposite to the front direction DF. The upward direction DU is a vertically upward direction, and the downward direction DD is opposite to the upward direction DU. The right direction DR is a right direction viewed from the vehicle 10 traveling in the front direction DF, and the left direction DL is opposite to the right direction DR. All the directions DF, DB, DR, and DL are horizontal directions. The right and left directions DR and DL are perpendicular to the front direction DF.

In this embodiment, this vehicle 10 is a small single-seater vehicle. The vehicle 10 (FIGS. 1 and 2) is a tricycle which includes a vehicle body 90, a single front wheel 12F coupled to the vehicle body 90, and two rear wheels 12L, 12R coupled to the vehicle body 90 and spaced apart in the width direction of the vehicle 10 (i.e. a direction parallel to the right direction DR). The front wheel 12F is steerable, and is located at the center of the vehicle 10 in its width direction. The rear wheels 12L, 12R are unsteerable drive wheels, and are located symmetrically with regard to the center of the vehicle 10 in its width direction.

The vehicle body 90 (FIG. 1) has a main body 20. The main body 20 has a front portion 20a, a bottom portion 20b, a rear portion 20c, and a support portion 20d. The bottom portion 20b is a plate which extends in the horizontal directions (i.e. directions perpendicular to the upward direction DU). The front portion 20a is a plate-like portion which extends obliquely from the end of the bottom portion 20b in the front direction DF side toward the front direction DF side and upward direction DU side. The rear portion 20c is a plate-like portion which extends obliquely from the end of the bottom portion 20b in the back direction DB side toward the back direction DB side and upward direction DU side. The support portion 20d is a plate-like portion which extends from the top of the rear portion 20c toward the back direction DB. For example, the main body 20 has a metal frame, and panels attached to the frame.

The vehicle body 90 (FIG. 1) further includes a seat 11 attached onto the bottom portion 20b, an accelerator pedal 45 and a brake pedal 46 located in the front direction DF side of the seat 11 on the bottom portion 20b, a controller 110 located below the seat surface of the seat 11 and attached onto the bottom portion 20b, a battery 120 attached to the bottom portion 20b below the controller 110, a steering device 41 attached to the end in the front direction DF side of the front portion 20a, and a shift switch 47 attached to the steering device 41. It should be noted that other members (e.g. roof, headlight, etc.) may be attached to the main body 20 although they are not shown in the figures. The vehicle body 90 includes the members attached to the main body 20.

The accelerator pedal 45 is a pedal for accelerating the vehicle 10. An amount of pressing the accelerator pedal 45 (sometimes referred to as "accelerator operation amount") represents an acceleration force desired by the user. The brake pedal 46 is a pedal for decelerating the vehicle 10. An amount of pressing the brake pedal 46 (sometimes referred to as "brake operation amount") represents a deceleration force desired by the user. The shift switch 47 is a switch for selecting a driving mode of the vehicle 10. In this embodiment, it is possible to select a mode from among four driving modes, "drive," "neutral," "reverse," and "parking." The "drive" mode is a mode for moving forward by driving the drive wheels 12L, 12R, the "neutral" mode is a mode in which the drive wheels 12L, 12R can rotate freely, the "reverse" mode is a mode for moving backward by driving the drive wheels 12L, 12R, the "parking" mode is a mode in which at least one wheel (e.g. rear wheels 12L. 12R) cannot rotate.

The steering device 41 (FIG. 1) is a device that supports the front wheel 12F so that it can be turned about a turning axis Ax1 to the turning direction of the vehicle 10. The steering device 41 includes a front fork 17 rotatably supporting the front wheel 12F, a steering wheel 41a as an operation input unit to which the user inputs his/her desired turning direction and operation amount, a steering motor 65 for turning the front fork 17 (i.e. front wheel 12F) about the turning axis Ax1.

For example, the front fork 17 (FIG. 1) is a telescopic fork with a built-in suspension (coil spring and shock absorber). For example, the steering motor 65 is an electric motor having a stator and a rotor. One of the stator and rotor is attached to the main body 20, and the other is attached to the front fork 17.

The steering wheel 41a (FIG. 1) can rotate about a supporting rod 41ax which extends along the rotational axis of the steering wheel 41a. The rotational direction of the steering wheel 41a (right or left) represents a turning direction desired by the user. The operation amount of the steering wheel 41a with respect to a predetermined orientation corresponding to the straight movement (i.e. rotational angle; hereinafter referred to as "steering wheel angle") represents the magnitude of steering angle AF (FIG. 2). The steering angle AF is an angle with respect to the front direction DF of a direction D12 in which the front wheel 12F rolls when the vehicle 10 is viewed in the downward direction DD. This direction D12 is perpendicular to the rotational axis of the front wheel 12F. In this embodiment, "AF=0" indicates that "direction D12=front direction DF," "AF>0" indicates that the direction D12 is deflected toward the right direction DR side, and "AF<0" indicates that the direction D12 is deflected toward the left direction DL side. The controller 110 (FIG. 1) can control the steering motor 65 so that the orientation of the front fork 17 (i.e. the steering angle AF of the front wheel 12F (FIG. 2)) is changed according to the orientation of the steering wheel 41a when the user changes the orientation of the steering wheel 41a.

In addition, the operation modes of the steering device 41 include a first mode in which the front wheel 12F is supported while the steering angle AF of the front wheel 12F changes following a lean of the vehicle body 90 regardless of the state of the steering wheel 41a, and a second mode in which the steering angle AF is controlled by the steering motor 65. The first mode will be discussed in detail later.

As shown in FIG. 1, in this embodiment, when the vehicle 10 is placed on a horizontal ground GL, the turning axis Ax1 of the steering device 41 is tilted obliquely relative to the ground GL, and specifically a direction which is parallel to the turning axis Ax1 and faces the downward direction DD side extends obliquely forward. Therefore, the intersection point P2 between the turning axis Ax1 of the steering device 41 and the ground GL is located in the front direction DF side of the contact point P1 of the front wheel 12F with the ground GL. The distance Lt in the back direction DB between these points P1, P2 is referred to as a trail. A positive trail Lt indicates that the contact point P1 is located in the back direction DB side of the intersection point P2.

The two rear wheels 12L, 12R (FIG. 4) are rotatably supported by a rear wheel support 80. The rear wheel support 80 includes a link mechanism 30, a lean motor 25 mounted on the top of the link mechanism 30, a first support portion 82 attached onto the top of the link mechanism 30, and a second support portion 83 attached to the front of the link mechanism 30 (FIG. 1). In FIG. 1, for purposes of illustration, portions of the link mechanism 30, first support portion 82, and second support portion 83 which are hidden by the rear wheel 12R are also depicted in solid lines. In FIG. 2, for purposes of illustration, the rear wheel support 80, rear wheels 12L, 12R, and connector 75 which are hidden by the main body 20 are depicted in solid lines. In FIGS. 1-3, the link mechanism 30 is depicted simply.

The first support portion 82 (FIG. 4) is located in the upward direction DU side of the link mechanism 30. The first support portion 82 includes a plate-like section which extends parallel to the right direction DR from a location in the upward direction DU side of the left rear wheel 12L to a location in the upward direction DU side of the right rear wheel 12R. The second support portion 83 (FIG. 1, FIG. 2) is located in the front direction DF side of the link mechanism 30 between the left rear wheel 12L and the right rear wheel 12R.

The right rear wheel 12R (FIG. 1) includes a wheel 12Ra with a rim, and a tire 12Rb mounted on the rim of the wheel 12Ra. The wheel 12Ra (FIG. 4) is connected to a right electric motor 51R. The right electric motor 51R has a stator and a rotor (not shown). One of the rotor and stator is attached to the wheel 12Ra, and the other is attached to the rear wheel support 80. The rotational axis of the right electric motor 51R is the same as that of the wheel 12Ra, and is parallel to the right direction DR. The configuration of the left rear wheel 12L is similar to that of the right rear wheel 12R. Specifically, the left rear wheel 12L has a wheel 12La and a tire 12Lb. The wheel 12La is connected to a left electric motor 51L. One of the rotor and stator of the left electric motor 51L is attached to the wheel 12La, and the other is attached to the rear wheel support 80. These electric motors 51L, 51R are in-wheel motors which directly drive the rear wheels 12L, 12R.

The link mechanism 30 (FIG. 4) includes three longitudinal link members 33L, 21, 33R arranged in order toward the right direction DR, and two lateral link members 31U, 31D arranged in order toward the downward direction DD. The longitudinal link members 33L, 21, 33R are parallel to the vertical direction when the vehicle 10 is stopped. The lateral link members 31U, 31D are parallel to the horizontal direction when the vehicle 10 is stopped. The two longitudinal link members 33L, 33R, and the two lateral link members 31U, 31D form a parallelogram link mechanism. The left electric motor 51L is attached to the left longitudinal link member 33L. The right electric motor 51R is attached to the right longitudinal link member 33R. The upper lateral link member 31U couples the upper ends of the longitudinal link members 33L, 33R. The lower lateral link member 31D couples the lower ends of the longitudinal link members 33L, 33R. The center longitudinal link member 21 couples the centers of the lateral link members 31U, 31D. These link members 33L, 33R, 31U, 31D, 21 are mutually coupled rotatably, and their rotational axes are parallel to the front direction DF. On the top of the center longitudinal link member 21, the first support portion 82 and second support portion 83 (FIG. 1) are secured. The link members 33L, 21, 33R, 31U, 31D, and the support portions 82, 83 are, for example, made from metal.

For example, the lean motor 25 is an electric motor having a stator and a rotor. One of the stator and rotor of the lean motor 25 is secured to the center longitudinal link member 21, and the other is secured to the upper lateral link member 31U. The rotational axis of the lean motor 25 is the same as that of the coupling portion of these link members 31U, 21, and is located at the center of the vehicle 10 in its width direction. When the rotor of the lean motor 25 rotates relative to the stator, the upper lateral link member 31U is tilted with respect to the center longitudinal link member 21. This causes the vehicle 10 to lean.

Figure 5:
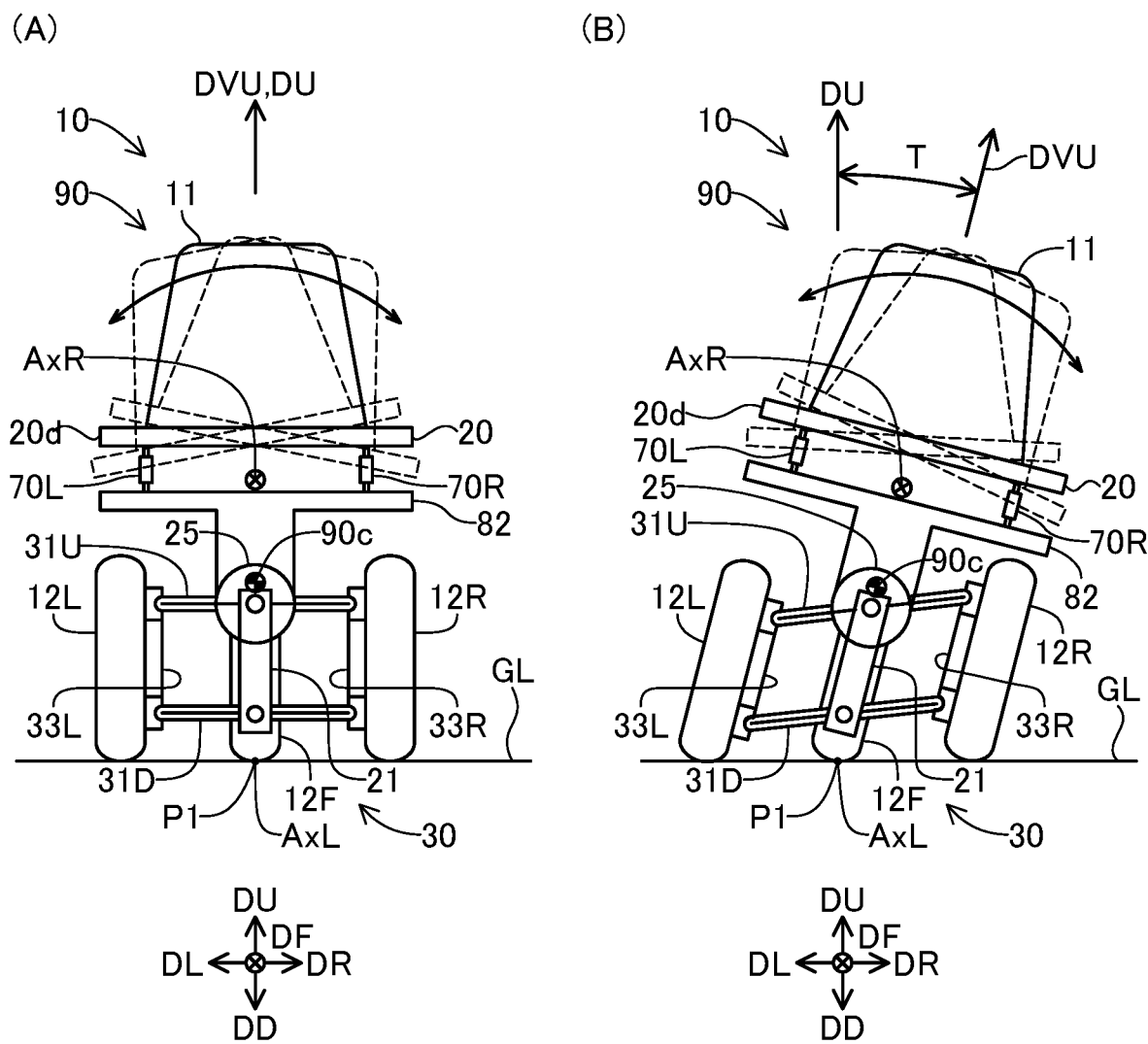
FIGS. 5(A) and 5(B) are schematic diagrams showing states of the vehicle 10.

FIG. 5 shows a schematic diagram of the states of the vehicle 10. This figure shows simplified rear views of the vehicle 10. FIG. 5(A) shows the state in which the vehicle 10 stands upright while FIG. 5(B) shows the state in which the vehicle 10 leans. As shown in FIG. 5(A), when the upper lateral link member 31U is perpendicular to the center longitudinal link member 21, all of the wheels 12F, 12L, 12R stand upright relative to the flat ground GL. Also, the whole vehicle 10 including the vehicle body 90 stands upright relative to the ground GL. A vehicle upward direction DVU in the figure represents the upward direction of the vehicle 10. With the vehicle 10 not leaning, the vehicle upward direction DVU is the same as the upward direction DU. It should be noted that the vehicle body 90 is rotatable relative to the rear wheel support 80 as described later. In this embodiment, therefore, the orientation of the rear wheel support 80 (specifically, the orientation of the center longitudinal link member 21 which is the basis of movement of the link mechanism 30) is adopted as the vehicle upward direction DVU.

As shown in FIG. 5(B), when the upper lateral link member 31U is tilted relative to the center longitudinal link member 21, one of the right rear wheel 12R and left rear wheel 12L moves in the vehicle upward direction DVU side while the other moves in an opposite direction side to the vehicle upward direction DVU. That is, the link mechanism 30 and the lean motor 25 change the relative position, in a direction perpendicular to the rotational axis, between the pair of wheels 12L, 12R spaced apart in the width direction. As a result, these wheels 12F, 12L, 12R lean relative to the ground GL while all of the wheels 12F, 12L, 12R have contact with the ground GL. Also, the whole vehicle 10 including the vehicle body 90 leans relative to the ground GL. In the example of FIG. 5(B), the right rear wheel 12R moves in the vehicle upward direction DVU side while the left rear wheel 12L moves in the opposite direction side. As a result, the wheels 12F, 12L, 12R, and thus the whole vehicle 10 including the vehicle body 90 lean to the right direction DR side. As described later, when the vehicle 10 turns to the right direction DR side, the vehicle 10 leans to the right direction DR side. When the vehicle 10 turns to the left direction DL side, the vehicle 10 leans to the left direction DL side.

In FIG. 5(B), the vehicle upward direction DVU is tilted in the right direction DR side relative to the upward direction DU. Hereinafter, when the vehicle 10 is viewed in the front direction DF, the angle between the upward direction DU and the vehicle upward direction DVU is referred to as lean angle T. Where "T>0" indicates a lean to the right direction DR side while "T<0" indicates a lean to the left direction DL side. When the vehicle 10 leans, the vehicle body 90 also leans to substantially the same direction. The lean angle T of the vehicle 10 can be considered as the lean angle T of the vehicle body 90.

The lean motor 25 has a lock mechanism (not shown) for unrotatably locking the lean motor 25. By operating the lock mechanism, the upper lateral link member 31U is unrotatably locked relative to the center longitudinal link member 21. As a result, the lean angle T is fixed. For example, the lean angle T is fixed at zero when the vehicle 10 is parked. Preferably, the lock mechanism is a mechanical mechanism which consumes no electric power when locking the lean motor 25 (and thus the link mechanism 30).

A lean axis AxL is shown in FIGS. 5(A) and (B). The lean axis AxL is located on the ground GL. The vehicle 10 can lean to right and left about the lean axis AxL. The lean axis AxL extends from the back direction DB side toward the front direction DF side. In this embodiment, the lean axis AxL is located on the ground GL, and is a straight line which passes through a contact point P1 between the front wheel 12F and the ground GL, and which is parallel to the front direction DF. The contact point P1 is a gravity center position of the ground contact surface of the front wheel 12F (i.e. the contact area between the front wheel 12F and the ground GL). Such a contact point P1 indicates a center of contact surface between the front wheel 12F and the ground GL. The gravity center of the area is a position of gravity center on the assumption that its mass is distributed evenly across the area. As described later, when the vehicle 10 turns, the lean motor 25 causes the vehicle 10 to lean toward the turning direction side (i.e. center side of turning). This stabilizes the turning of the vehicle 10. In this manner, the link mechanism 30 for rotatably supporting the rear wheels 12L, 12R, and the lean motor 25 as an actuator for actuating the link mechanism 30 constitute a lean mechanism which leans the vehicle body 90 in the width direction of the vehicle 10. The lean angle T is a lean angle caused by the lean mechanism.

The vehicle body 90 (specifically, main body 20) is coupled to the rear wheel support 80 rotatably about a roll axis AxR which extends from the back direction DB side toward the front direction DF side, as shown in FIGS. 1, 5(A), and 5(B). In this embodiment, the main body 20 is coupled to the rear wheel support 80 via a suspension system 70 and the connector 75, as shown in FIGS. 2 and 4. The suspension system 70 has a left suspension 70L and a right suspension 70R. In this embodiment, each of the suspensions 70L, 70R is a telescopic suspension with built-in coil spring and shock absorber. Each suspension 70L, 70R can extend or retract along a central axis 70La, 70Ra (FIG. 4) of each suspension 70L, 70R. When the vehicle 10 stands upright as shown in FIG. 4, the axis of each suspension 70L, 70R is approximately parallel to the vertical direction. The upper ends of the suspensions 70L, 70R are coupled to the support portion 20d of the main body 20 rotatably about a rotational axis parallel to a first axis direction (e.g. the front direction DF). The lower ends of the suspensions 70L, 70R are coupled to the first support portion 82 of the rear wheel support 80 rotatably about a rotational axis parallel to a second axis direction (e.g. the right direction DR). It should be noted that the configuration of the coupling portions between the suspensions 70L, 70R and the other members may be a variety of other configurations (e.g. ball-and-socket joint).

The connector 75 is a rod which extends in the front direction DF as shown in FIGS. 1 and 2. The connector 75 is located at the center of the vehicle 10 in its width direction. The end of the connector 75 in the front direction DF side is coupled to the rear portion 20c of the main body 20. The coupling portion is configured as ball-and-socket joint, for example. The connector 75 can move in any direction relative to the rear portion 20c within a predetermined range. The end of the connector 75 in the back direction DB side is coupled to the second support portion 83 of the rear wheel support 80. The coupling portion is configured as ball-and-socket joint, for example. The connector 75 can move in any direction relative to the second support portion 83 within a predetermined range.

In this manner, the main body 20 (and thus the vehicle body 90) is coupled to the rear wheel support 80 via the suspension system 70 and the connector 75. The vehicle body 90 is movable relative to the rear wheel support 80. The roll axis AxR of FIG. 1 represents a central axis about which the vehicle body 90 rotates relative to the rear wheel support 80 in the right direction DR or left direction DL. In this embodiment, the roll axis AxR is a straight line which passes through the contact point P1 between the front wheel 12F and the ground GL, and through the vicinity of the connector 75. The vehicle body 90 can rotate in its width direction about the roll axis AxR through the extension/retraction of the suspensions 70L, 70R. It should be noted that in this embodiment, the lean axis AxL about which leaning occurs through the lean mechanism is different form the roll axis AxR.

In FIGS. 5(A) and (B), the vehicle body 90 which rotates about the roll axis AxR is shown in dotted lines. The roll axis AxR in this figure represents a location of the roll axis AxR on a plane which includes the suspensions 70L, 70R, and which is perpendicular to the front direction DF. As shown in FIG. 5(B), the vehicle body 90 can also rotate about the roll axis AxR to the right direction DR and to the left direction DL even when the vehicle 10 leans.

The vehicle body 90 can rotate in the width direction of the vehicle 10 relative to the vertically upward direction DU (and thus the ground GL) through a rotation by the rear wheel support 80 and a rotation by the suspension system 70 and connector 75. The rotation of the vehicle body 90 in its width direction achieved in an integrated manner in the overall vehicle 10 may be referred to as roll. In this embodiment, the roll of the vehicle body 90 is principally caused through all of the rear wheel support 80, the suspension system 70, and the connector 75. A roll is also caused by a deformation of the members of the vehicle 10, such as the vehicle body 90 and the tires 12Rb, 12Lb.

A gravity center 90c is shown in FIGS. 1, 5(A), and 5(B). This gravity center 90c is a gravity center of the vehicle body 90 under a full load condition. The full load condition means that the vehicle 10 carries an occupant (and possibly a load) so that the gross weight of the vehicle 10 becomes the acceptable gross weight. For example, no maximum loading weight may be specified, but a maximum riding capacity may be specified. In this case, the gravity center 90c is a gravity center when the vehicle 10 is filled to its maximum riding capacity. A reference body weight (e.g. 55 kg) preset corresponding to the maximum riding capacity is adopted as occupant's body weight. Alternatively, a maximum loading weight may be specified in addition to a maximum riding weight. In this case, the gravity center 90c is a gravity center of the vehicle body 90 when the vehicle 10 is filled to its maximum riding capacity and maximum loading capacity.

As shown, the gravity center 90c is located in the downward direction DD side of the roll axis AxR. Therefore, if the vehicle body 90 oscillates about the roll axis AxR, an excessive increase in amplitude of oscillation can be suppressed. In this embodiment, the battery 120, which is a relatively heavy element among the elements of the vehicle body 90 (FIG. 1), is located in a lower position in order to locate the gravity center 90c in the downward direction DD side of the roll axis AxR. Specifically, the battery 120 is secured to the bottom portion 20b, which is the lowest portion among the main body 20 of the vehicle body 90. Therefore, the gravity center 90c can be easily made lower than the roll axis AxR.

Figure 6:
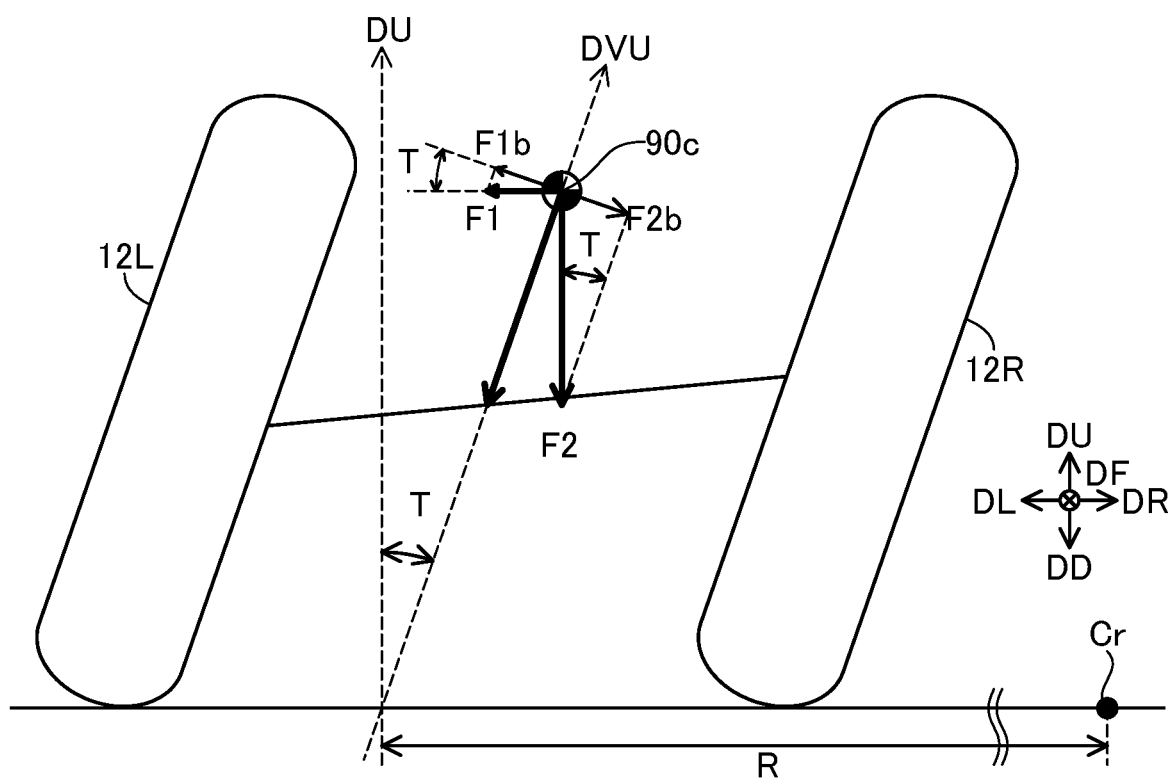
FIG. 6 is an explanatory diagram showing a balance of forces during turning.

FIG. 6 is an explanatory diagram showing a balance of forces during turning. This figure shows a rear view of the rear wheels 12L, 12R during turning to right. As described later, when the turning direction is the right direction, the controller 110 (FIG. 1) can control the lean motor 25 so that the rear wheels 12L, 12R (and thus the vehicle 10) lean relative to the ground GL to the right direction DR.

A first force F1 in the figure is a centrifugal force acting on the vehicle body 90. A second force F2 is a gravity acting on the vehicle body 90. Where the mass of the vehicle body 90 is m (kg), the acceleration of gravity is g (about 9.8 m/s$^2$), the lean angle of the vehicle 10 relative to the vertical direction is T (degree), the velocity of the vehicle 10 during turning is V (m/s), and the turning radius is R (m). The first force F1 and the second force F2 are expressed in Equations 1 and 2, respectively:

$$F1=(mV^2)/R \quad \text{(Equation 1)}$$

$$F2=mg \quad \text{(Equation 2)}$$

In addition, a force F1b in the figure is a component of the first force F1 in a direction perpendicular to the vehicle upward direction DVU. A force F2b is a component of the second force F2 in a direction perpendicular to the vehicle upward direction DVU. The force F1b and the force F2b are expressed in Equations 3 and 4, respectively:

$$F1b=F1\cos(T) \quad \text{(Equation 3)}$$

$$F2b=F2\sin(T) \quad \text{(Equation 4)}$$

The force F1b is a component which causes the vehicle upward direction DVU to be rotated to the left direction DL side while the force F2b is a component which causes the vehicle upward direction DVU to be rotated to the right direction DR side. When the vehicle 10 continues to turn stably with the lean angle T (and furthermore the velocity V and turning radius R) maintained, the relationship between F1b and F2b is expressed in the following equation 5:

$$F1b=F2b \quad \text{(Equation 5)}$$

By substituting Equations 1-4 as discussed above into Equation 5, the turning radius R is expressed in Equation 6:

$$R=V^2/(g\tan(T)) \quad \text{(Equation 6)}$$

Equation 6 is established independently of the mass m of the vehicle body 90.

Figure 7:
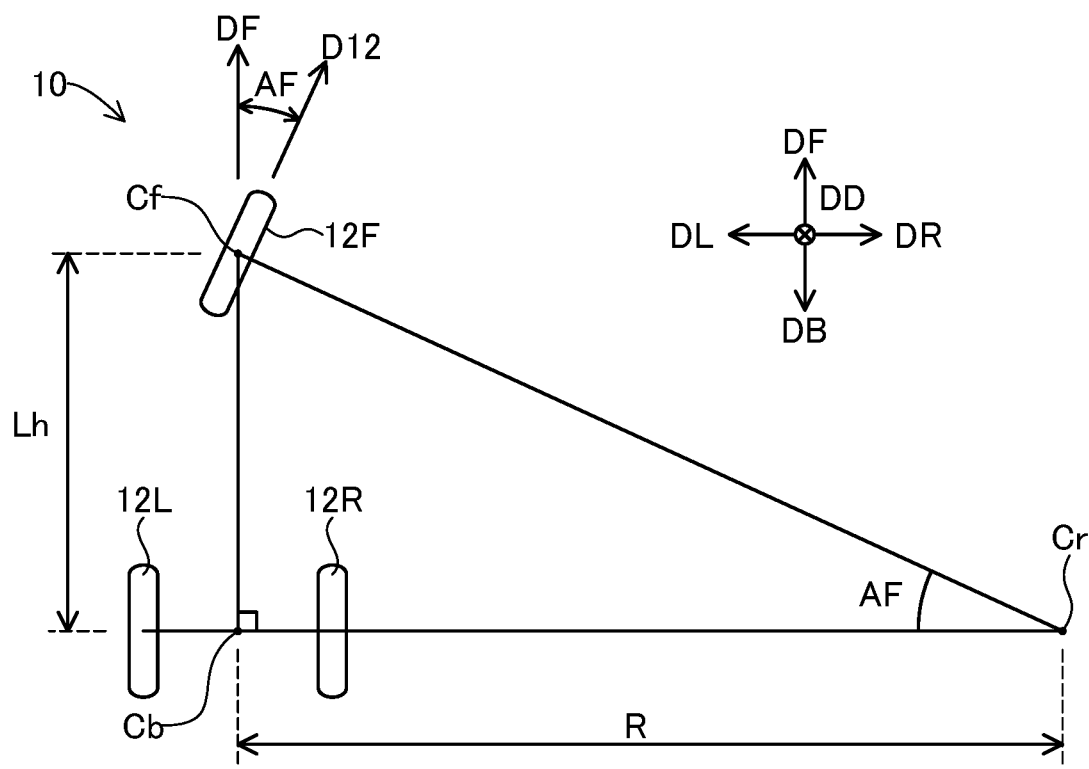
FIG. 7 is an explanatory diagram showing a simplified relationship between the steering angle AF and the turning radius R.

FIG. 7 is an explanatory diagram showing a simplified relationship between the steering angle AF and the turning radius R. This figure shows the wheels 12F, 12L, 12R viewed in the downward direction DD. In the figure, the front wheel 12F turns to the right direction DR, and thus the vehicle 10 turns to the right direction DR. A front center Cf in the figure is the center of the front wheel 12F. The front center Cf is located on the rotational axis of the front wheel 12F. The front center Cf is located at the approximately same position as the contact point P1 (FIG. 1). A rear center Cb is the center between the two rear wheels 12L, 12R. The rear center Cb is located at the middle between the rear wheels 12L, 12R on the rotational axis of the rear wheels 12L, 12R. A center Cr is the turning center (referred to as turning center Cr). A wheelbase Lh is the distance between the front center Cf and the rear center Cb in the front direction DF. As shown in FIG. 1, the wheelbase Lh is the distance between the rotational axis of the front wheel 12F and that of the rear wheels 12L, 12R in the front direction DF.

As shown in FIG. 7, the front center Cf, rear center Cb, and turning center Cr form a right-angled triangle. The internal angle of the vertex Cb is 90 degrees. The internal angle of the vertex Cr is equal to the steering angle AF. Therefore, the relationship between the steering angle AF and the turning radius R is expressed in Equation 7:

$$AF=\arctan(Lh/R) \quad \text{(Equation 7)}$$

It should be noted that there are a variety of difference between the actual behavior of the vehicle 10 and the simplified behavior in FIG. 7. For example, the actual wheels 12F, 12L, 12R can slip relative to the ground GL. In addition, the actual rear wheels 12L, 12R lean. Therefore, the actual turning radius may be different from the turning radius R in Equation 7. However, Equation 7 can be used as a good approximate equation which represents the relationship between the steering angle Af and the tuning radius R.

When the vehicle 10 leans to the right direction DR side during its forward movement as shown in FIG. 5(B), the gravity center 90c of the vehicle body 90 moves to the right direction DR side, and thus the traveling direction of the vehicle 10 changes to the right direction DR side. Also, in this embodiment, the vehicle 10 has a positive trail Lt as described with regard to FIG. 1. Therefore, when the vehicle 10 leans to the right direction DR side during its forward movement, the orientation of the front wheel 12F (i.e. steering angle AF) can spontaneously turn to the new traveling direction of the vehicle 10, that is, its lean direction (right direction DR in the example of FIG. 5(B)). When the steering device 41 operates in the first mode, the orientation of the front wheel 12F spontaneously turns to the lean direction following beginning of change in the lean angle T. Thus, the vehicle 10 turns toward the lean direction.

In addition, the behavior of the vehicle 10 is stabilized because the forces F1b, F2b (FIG. 6, Equation 5) balance each other when the tuning radius is equal to the turning radius R expressed in Equation 6 discussed above. The vehicle 10 turning at the lean angle T will turn in the turning radius R expressed in Equation 6. In addition, the orientation of the front wheel 12F (steering angle AF) spontaneously faces the traveling direction of the vehicle 10 because the vehicle 10 has a positive trail Lt. Therefore, when the vehicle 10 turns at the lean angle T, the orientation of the turnable front wheel 12F (steering angle AF) can settle at an orientation of the steering angle AF specified based on the turning radius R expressed in Equation 6, and Equation 7. In this manner, the steering angle AF changes following the lean of the vehicle body 90.

Figure 8:
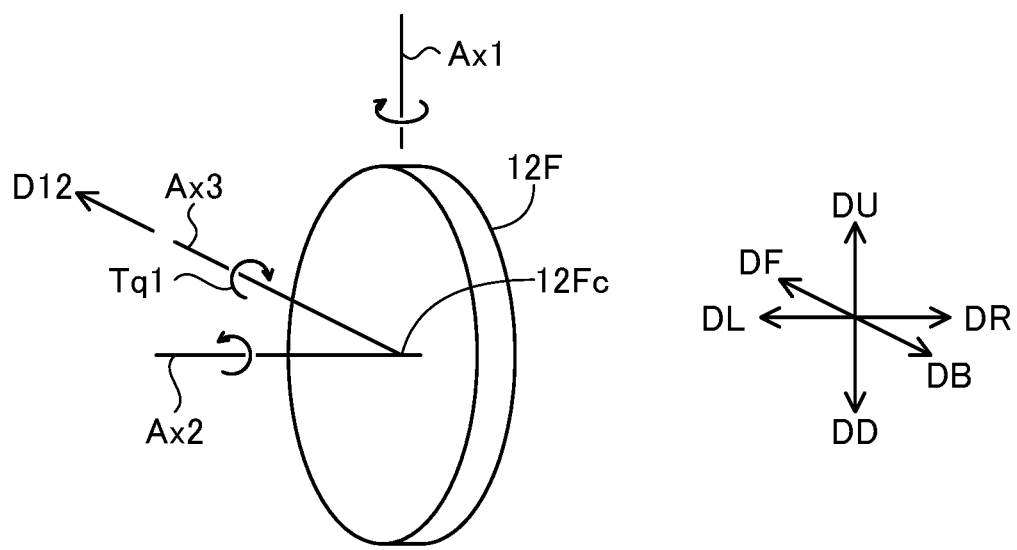
FIG. 8 is an explanatory diagram illustrating forces which act on a rotating front wheel 12F.

Furthermore, in this embodiment, when the vehicle body 90 leans, the front wheel 12F is subject to a force that rotates the steering angle AF to the lean direction independently of the trail Lt. FIG. 8 is an explanatory diagram illustrating forces which act on the rotating front wheel 12F. This figure shows a perspective view of the front wheel 12F. In the example of FIG. 8, the direction D12 of the front wheel 12F is the same as the front direction DF. A rotational axis Ax2 is a rotational axis of the front wheel 12F. When the vehicle 10 moves forward, the front wheel 12F rotates about this rotational axis Ax2. The figure shows the turning axis Ax1 of the steering device 41 (FIG. 1) and a front axis Ax3. The turning axis Ax1 extends from the upward direction DU side to the downward direction DD side. The front axis Ax3 is an axis which passes through the gravity center 12Fc of the front wheel 12F and is parallel to the direction D12 of the front wheel 12F. It should be noted that the rotational axis Ax2 of the front wheel 12F also passes through the gravity center 12Fc of the front wheel 12F.

As described with regard to FIG. 1 etc., in this embodiment, the steering device 41, which supports the front wheel 12F, is secured to the vehicle body 90. Therefore, when the vehicle body 90 leans, the steering device 41 leans along with the vehicle body 90, and thus the rotational axis Ax2 of the front wheel 12F will also lean to the same direction in a similar fashion. When the vehicle body 90 of the moving vehicle 10 leans to the right direction DR side, the front wheel 12F, which rotates about the rotational axis Ax2, is subject to a torque Tq1 (FIG. 8) that causes the front wheel 12F to lean to the right direction DR side. This torque Tq1 includes a component of force that acts to lean the front wheel 12F about the front axis Ax3 to the right direction DR. Such a movement of a rotating object when an external torque is applied to the object is known as precession movement. For example, the rotating object turns about an axis perpendicular to the rotational axis and the axis of the external torque. In the example of FIG. 8, the application of the torque Tq1 causes the rotating front wheel 12F to turn about the turning axis Ax1 of the steering device 41 to the right direction DR side. In this manner, due to the angular momentum of the rotating front wheel 12F, the direction of the front wheel 12F (i.e. steering angle AF) changes following a lean of the vehicle body 90.

The above description refers to the case where the vehicle 10 leans to the right direction DR side. The above discussion is also applicable to the case where the vehicle 10 leans to the left direction DL side.

When the vehicle 10 repeatedly turns to right and to left, the lean angle T oscillates between right and left. This also causes the vehicle body 90 to oscillate between right and left. The steering angle AF can oscillate following the oscillation of the vehicle body 90. Specifically, the steering angle AF can oscillate following the oscillation of the lean angle T (FIG. 5(B)). It should be noted that as described above with regard to FIG. 5(A), FIG. 5(B), the vehicle body 90 can rotate further away from the lean angle T in its width direction through the extension/retraction of the suspensions 70L, 70R. The steering angle AF can change following the lean of the vehicle body 90 after such a rotation. However, a deviation of the lean of the vehicle body 90 from the lean angle T is typically small as compared with the lean angle T. Therefore, the steering angle AF can be considered to change following the lean angle T.

Figure 9:
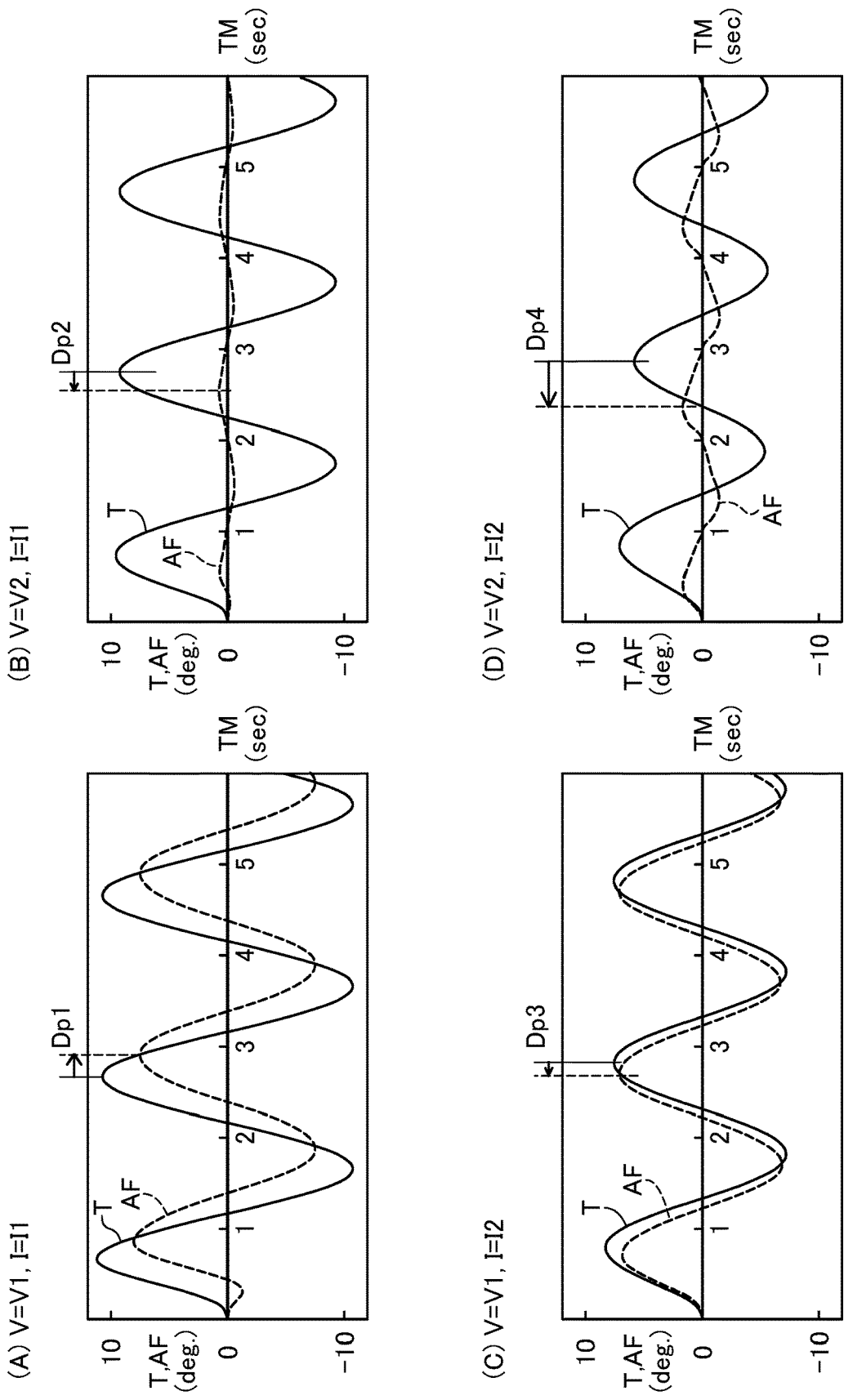
FIG. 9(A)-9(D) are graphs showing examples of oscillation of a steering angle AF relative to that of a lean angle T.

FIGS. 9(A)-9(D) are graphs showing examples of oscillation of the steering angle AF relative to that of the lean angle T. The horizontal axis represents time TM (in second), and the vertical axis represents the lean angle T and steering angle AF (in degree). One of the vehicle velocity V and the inertia moment I of the front wheel 12F (FIG. 8) is different between these graphs. The inertia moment I is an inertia moment about the rotational axis Ax2 of the front wheel 12F. The velocity V is either a first velocity V1 or a second velocity V2 (V2>V1>0), and the inertia moment I is either a first value I1 or a second value I2 (I2>I1>0). In FIG. 9(A), V=V1, I=I1, in FIG. 9(B), V=V2, I=I1, in FIG. 9(C), V=V1, I=I2, in FIG. 9(D), V=V2, I1=I2. Each graph shows a result of simulation which indicates mechanical behavior of model for the vehicle 10 (FIG. 1-FIG. 4). In the simulations, the first velocity V1 is equal to 20 km/h, the second velocity V2 is equal to 40 km/h, the first value I1 is equal to 0.165 kgm$^2$, and the second value I2 is equal to 1.0 kg/m$^2$. The frequency of the lean angle T is equal to 0.5 Hz As shown in FIG. 9(A), when the velocity V is relatively lower, and the inertia moment I is relatively smaller, the steering angle AF oscillates in a delayed fashion relative to that of the lean angle T. A phase difference Dp1 in the figure represents a phase delay of the steering angle AF relative to the lean angle T, and is 0.24 seconds. On the other hand, as shown in FIGS. 9(B)-9(D), when at least one of the velocity V and the inertia moment I is relatively larger, the steering angle AF oscillates forwardly relative to that of the lean angle T. Phase differences Dp2-Dp4 of FIGS. 9(B)-9(D) represent phase leads of the steering angle AF relative to the lean angle T, and Dp2=0.25 seconds, Dp3=0.07 seconds, Dp4=0.48 seconds, respectively. In this manner, when at least one of the velocity V and the inertia moment I is larger, the phase of the steering angle AF precedes that of the lean angle T. Such a phenomenon has been observed not only in the simulation but also when a prototype of the vehicle 10 actually moves. Such lead and delay of phase of the steering angle AF can be expressed by using a relationship between the oscillation of the lean angle T and a torque acting on the front wheel 12F.

FIGS. 10(A)-10(C) are graphs illustrating the oscillation of the lean angle T and the torque acting on the front wheel 12F. In each figure, the horizontal axis represents time TM. FIG. 10(A) shows the oscillation of torques tqa, tqb acting on the front wheel AF, relative to the oscillation of the lean angle T. The first torque tqa is the same as the torque Tq1 related to precession movement described above with regard to FIG. 8, and is caused by tilting the rotational axis Ax2 of the rotating front wheel 12F. The second torque tqb is caused by the trail Lt described above with regard to FIG. 1 etc.

FIG. 10(B) is a graph illustrating the first torque tqa. The graph shows the lean angle T, a velocity Vt (i.e. angular velocity Vt) at which the lean angle T changes, and the first torque tqa. As shown, the angular velocity Vt of the oscillating lean angle T is at its maximum while the lean angle T is equal to zero (e.g. in the states Sa, Sc). In this situation, the direction of the angular velocity Vt is the same as the direction to which the lean angle T changes. For example, in the state Sa where the lean angle T changes from the left direction DL side to the right direction DR side, the direction of the angular velocity Vt is the right direction DR. In addition, the angular velocity Vt is equal to zero when the absolute value of the lean angle T is at its maximum, that is, the vehicle body 90 leans at its maximum amplitude (e.g. in the state Sb). In this manner, the phase of the angular velocity Vt precedes that of the lean angle T by 90 degrees. The first torque tqa related to precession movement is increased with an increase in the velocity (i.e. angular velocity) at which the rotational axis Ax2 of the front wheel 12F (FIG. 8) is turned. Therefore, as shown in FIG. 10(B), the first torque tqa oscillates in the same phase as that of the angular velocity Vt. That is, the phase of the first torque tqa precedes that of the lean angle T by 90 degrees. Such a first torque tqa acts on the front wheel 12F so as to turn the front wheel 12F in a phase preceding that of the lean angle T.

FIG. 10(C) is a graph illustrating the second torque tqb. The graph shows the lean angle T, an acceleration At (i.e. angular acceleration At) at which the lean angle T changes, and the second torque tqb. As shown, the angular acceleration At of the oscillating lean angle T is equal to zero while the lean angle T is equal to zero (e.g. in the states Sa, Sc). In addition, the angular acceleration At is at its maximum when the absolute value of the lean angle T is at its maximum, that is, the vehicle body 90 leans at its maximum amplitude (e.g. in the state Sb). In this situation, the direction of the angular acceleration At is opposite to the direction of the lean angle T. For example, the state Sb where the lean angle T is at its maximum in the right direction DR is a state where the direction of roll of the vehicle body 90 changes from the right direction DR to the left direction DL, and the direction of the angular acceleration At is the left direction DL. In this manner, the angular acceleration At is out of phase with the lean angle T by 180 degrees. As described later, the magnitude of the second torque tqb caused by the trail Lt (FIG. 1) is increased with an increase in the absolute value of the angular acceleration At, and the direction of the second torque tqb is opposite to that of the angular acceleration At. As a result, the second torque tqb oscillates in the same phase as the lean angle T.

Figure 11:
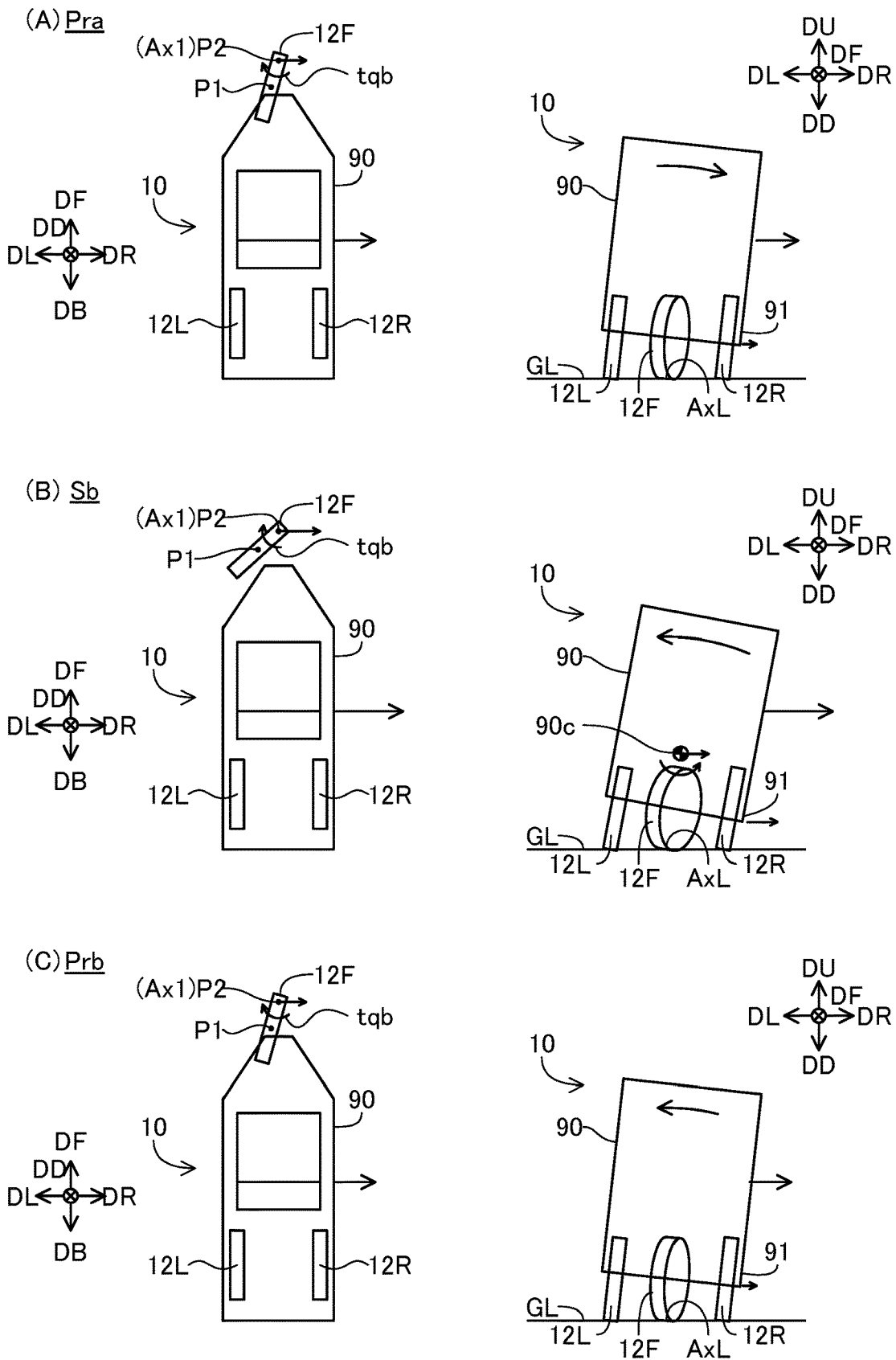
FIG. 11(A)-11(C) are explanatory diagrams of a second torque tqb.

FIGS. 11(A)-11(C) are explanatory diagrams of the second torque tqb. The left side of each figure schematically shows the vehicle 10 viewed in the downward direction DD, and the right side of each figure schematically shows the vehicle 10 viewed in the front direction DF. The left side of each figure also shows the contact point P1 of the front wheel 12F and the intersection point P2 described above with regard to FIG. 1. FIG. 11(A) shows the vehicle 10 during the time period Pra from the state Sa to the state Sb in FIG. 10(C). FIG. 11(B) shows the vehicle 10 in the state Sb. FIG. 11(C) shows the vehicle 10 during the time period Prb from the state Sb to the state Sc.

As shown in FIG. 11(A), during the time period Pra of transition from the state Sa where the vehicle body 90 stands upright to the state Sb where the vehicle body 90 leans at its maximum amplitude to the right direction DR side, the vehicle body 90 leans (or rolls) about the lean axis AxL to the right direction DR side. In addition, the vehicle 10 is turning to the right direction DR, and thus the vehicle body 90 moves to the right direction DR side. As a result, a lower portion 91 of the vehicle body 90 moves to the right direction DR side as shown in the right side of FIG. 11(A). When the lower portion 91 of the vehicle body 90 moves to the right direction DR side, the turning axis Ax1 moves to the right direction DR side, and thus the intersection point P2 also moves to the right direction DR side, as shown in the left side of FIG. 11(A). The contact point P1 of the front wheel 12F cannot move to the right direction DR side due to friction with the ground GL in contrast to the intersection point P2. As a result, the front wheel 12F is subject to a torque tqb that turns the front wheel 12F about the turning axis Ax1 to the right direction DR side (FIG. 10(C)).

As shown in FIG. 11(B), in the state Sb where the vehicle body 90 leans at its maximum amplitude to the right direction DR side, the vehicle body 90 begins to roll to the left direction DL side opposite to the right direction DR which is the turning direction. However, the vehicle 10 is turning to the right direction DR, and thus the vehicle body 90 moves to the right direction DR side. In addition, when the angular acceleration At of the lean angle T is larger, the vehicle body 90 is subject to a larger force which rolls the vehicle body 90 about its gravity center 90c, as compared with when the angular acceleration At is smaller. As a result, the lower portion 91 of the vehicle body 90 moves to the right direction DR side. And, as in the state of FIG. 11(A), the front wheel 12F is subject to the torque tqb that turns the front wheel 12F about the turning axis Ax1 to the right direction DR side (FIG. 10(C)). In addition, the angular acceleration At is larger, and thus the second torque tqb is increased.

As shown in FIG. 11(C), during the time period Prb of transition from the state Sb where the vehicle body 90 leans to the right direction DR side to the state Sc where the vehicle body 90 stands upright, the vehicle body 90 rolls about the lean axis AxL to the left direction DL side. However, the vehicle 10 is turning to the right direction DR, and thus the vehicle body 90 moves to the right direction DR side. As a result, the lower portion 91 of the vehicle body 90 moves to the right direction DR side as shown in the right side of FIG. 11(C). And, as in the state of FIG. 11(A), the front wheel 12F is subject to the torque tqb that turns the front wheel 12F about the turning axis Ax1 to the right direction DR side (FIG. 10(C)).

The above description refers to the case where the vehicle body 90 leans to the right direction DR side. The torques tqa, tqb also acts on the front wheel 12F in a similar fashion when the vehicle body 90 leans to the left direction DL side.

The front wheel 12F turns about the turning axis Ax1 of the steering device 41 (FIG. 1) by a combined torque of the first torque tqa and the second torque tqb. Such a torque can change the steering angle AF in the same phase as the oscillation of the lean angle T or in a phase preceding that of the lean angle T. In particular, when the first torque tqa is larger, the phase of the steering angle AF can precede that of the lean angle T.

On the other hand, the phase of the steering angle AF can be delayed relative to that of the lean angle T due to a variety of causes. For example, the change in orientation (i.e. steering angle AF) of the front wheel 12F is suppressed by an inertia moment of a member (e.g. front fork 17) which turns about the turning axis Ax1 of the steering device 41 along with the front wheel 12F. In addition, the change in the steering angle AF is also suppressed by a resistance (e.g. friction) to the turning about the turning axis Ax1. As a result, the change in the steering angle AF can be delayed relative to that in the lean angle T. Furthermore, the change in traveling direction of the vehicle 10 is suppressed by an inertia moment (sometimes referred to as yaw moment) relating to a turn of the vehicle 10. As a result, the change in traveling direction can be delayed relative to that in the lean angle T. Accordingly, the change in the steering angle AF can be delayed due to the delayed change in traveling direction.

When the combined torque of the first torque tqa and the second torque tqb is smaller, the phase of the steering angle AF is readily delayed relative to that of the lean angle T. When the combined torque of the first torque tqa and the second torque tqb is larger, the delay in phase of the steering angle AF is decreased. And, when the first torque tqa is larger, the phase of the steering angle AF can precede that of the lean angle T. The phase of the steering angle AF preceding that of the lean angle T means that the steering angle AF changes before the vehicle body 90 leans. When the steering angle AF changes prior to leaning of the vehicle body 90, a centrifugal force due to turning with the changed steering angle AF acts on the vehicle body 90 prior to the leaning of the vehicle body 90. This can deteriorate the driving stability of the vehicle 10. Therefore, it is preferable to suppress the phase lead of the steering angle AF.

It should be noted that the phase of the steering angle AF tends to precede when the first torque tqa is larger. As described above with regard to FIG. 8, the first torque tqa is increased with an increase in angular momentum of the front wheel 12F. The angular momentum of the front wheel 12F is larger when at least one of the inertia moment about the rotational axis Ax2 of the front wheel 12F and the angular velocity (i.e. velocity V) about the rotational axis Ax2 of the front wheel 12F is larger. Therefore, as described above with regard to FIGS. 9(A)-9(D), when at least one of the inertia moment I and the velocity V is larger (FIGS. 9(B)-9(D)), the phase of the steering angle AF can precede that of the lean angle T. When both of the inertia moment I and the velocity V is smaller (FIG. 9(A)), the phase of the steering angle AF can be delayed relative to that of the lean angle T. If the angular momentum of the front wheel 12F is fixed, the first torque tqa is increased with an increase in the velocity (i.e. angular velocity Vt (FIG. 10(B)) at which the rotational axis Ax2 of the front wheel 12F is turned. In this manner, when the velocity V is higher or when the angular velocity Vt is higher, the first torque tqa readily increases, that is, the phase of the steering angle AF readily precedes. Accordingly, in this embodiment, the controller 110 (FIG. 1) controls the steering motor 65 so that a turn resistance force which acts between the front wheel 12F and the vehicle body 90 is increased when the first torque tqa readily increases. This suppresses the phase lead of the steering angle AF.

Figure 12:
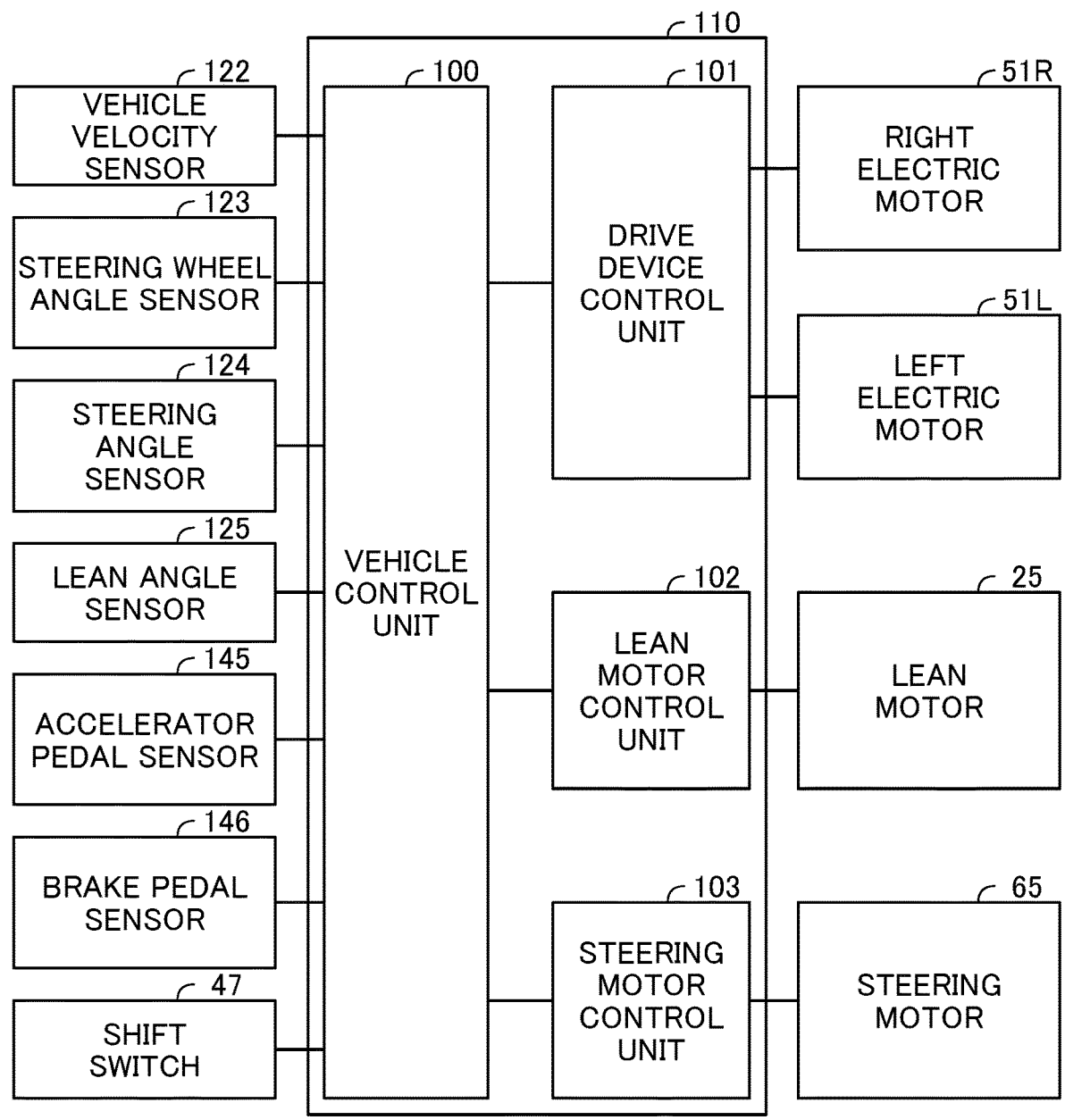
FIG. 12 is a block diagram showing a configuration relating to control of the vehicle 10.

FIG. 12 is a block diagram showing the configuration relating to control of the vehicle 10. The vehicle 10 includes as components for the control a vehicle velocity sensor 122, a steering wheel angle sensor 123, a steering angle sensor 124, a lean angle sensor 125, an accelerator pedal sensor 145, a brake pedal sensor 146, a shift switch 47, a controller 110, a right electric motor 51R, a left electric motor 51L, a lean motor 25, and a steering motor 65.

The vehicle velocity sensor 122 is a sensor for detecting a vehicle velocity of the vehicle 10. In this embodiment, the vehicle velocity sensor 122 is attached on the lower end of the front fork 17 (FIG. 1) to detect a rotational rate of the front wheel 12F, i.e. vehicle velocity.

The steering wheel angle sensor 123 is a sensor for detecting an orientation of the steering wheel 41a (i.e. steering wheel angle). "Steering wheel angle=0" indicates straight movement, "steering wheel angle >0" indicates a right turn, and "steering wheel angle <0" indicates left turn. The steering wheel angle represents a steering angle AF desired by the user, i.e. a target value of steering angle AF. In this embodiment, the steering wheel angle sensor 123 is attached to the supporting rod 41ax secured to the steering wheel 41a (FIG. 1).

The steering angle sensor 124 is a sensor for detecting a steering angle AF of the front wheel 12F. In this embodiment, the steering angle sensor 124 is attached to the steering motor 65 (FIG. 1).

The lean angle sensor 125 is a sensor for detecting a lean angle T. The lean angle sensor 125 is attached to the lean motor 25 (FIG. 4). As discussed above, the orientation of the upper lateral link member 31U relative to the center longitudinal link member 21 corresponds to the lean angle T. The lean angle sensor 125 detects the orientation of the upper lateral link member 31U relative to the center longitudinal link member 21, i.e. the lean angle T.

The accelerator pedal sensor 145 is a sensor for detecting an accelerator operation amount. In this embodiment, the accelerator pedal sensor 145 is attached to the accelerator pedal 45 (FIG. 1). The brake pedal sensor 146 is a sensor for detecting a brake operation amount. In this embodiment, the brake pedal sensor 146 is attached to the brake pedal 46 (FIG. 1).

It should be noted that each sensor 122, 123, 124, 125, 145, 146 is configured using a resolver or encoder, for example.

The controller 110 includes a vehicle control unit 100, a drive device control unit 101, a lean motor control unit 102, and a steering motor control unit 103. The controller 110 operates with electric power from the battery 120 (FIG. 1). The control units 100, 101, 102, 103 each has a computer. Each computer includes a processor (e.g. CPU), a volatile memory (e.g. DRAM), and a non-volatile memory (e.g. flash memory). The non-volatile memory stores in advance a program for operating the respective control unit. The processor performs a variety of processes by executing the program.

The processor of the vehicle control unit 100 receives signals from the sensors 122, 123, 124, 125, 145, 146, and from the shift switch 47, and then controls the vehicle 10 according to the received signals. Specifically, the processor of the vehicle control unit 100 controls the vehicle 10 by outputting instructions to the drive device control unit 101, the lean motor control unit 102, and the steering motor control unit 103 (described in detail later).

The processor of the drive device control unit 101 controls the electric motors 51L, 51R according to the instruction from the vehicle control unit 100. The processor of the lean motor control unit 102 controls the lean motor 25 according to the instruction from the vehicle control unit 100. The processor of the steering motor control unit 103 controls the steering motor 65 according to the instruction from the vehicle control unit 100. These control units 101, 102, 103 each have an electric circuit (e.g. inverter circuit) which supplies the electric motors 51L, 51R, 25, 65 to be controlled with electric power from the battery 120.

Hereinafter, a phrase "a processor of a control unit performs a process" is expressed briefly as a phrase "a control unit performs a process."

Figure 13:
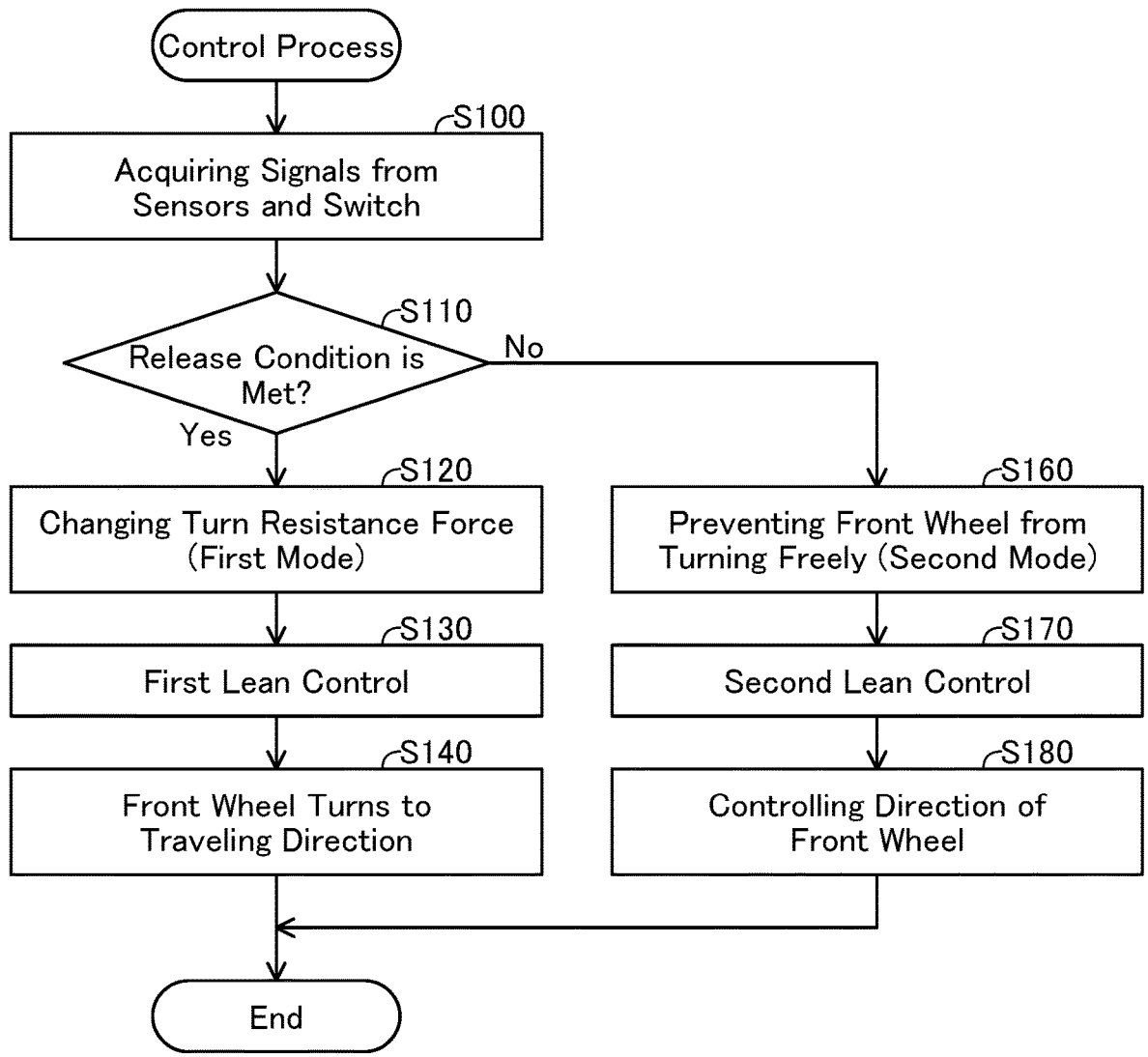
FIG. 13 is a flowchart showing an example control process.

FIG. 13 is a flowchart showing an example control process performed by the controller 110 (FIG. 12). The flowchart of FIG. 13 shows a procedure for controlling the rear wheel support 80 and the steering device 41. In the embodiment of FIG. 13, when the vehicle velocity V is equal to or larger than a predetermined threshold value Vth, the controller 110 operates the steering device 41 in the first mode where the front wheel 12F is supported so that the front wheel 12F changes following a lean of the vehicle body 90. When the vehicle velocity V is smaller than the threshold value Vth, the controller 110 operates the steering device 41 in the second mode where the orientation of the front wheel 12F (i.e. steering angle AF) is controlled actively. The controller 110 also perform lean control for leaning the vehicle 10 both in the case of the vehicle velocity V being equal to or larger than the threshold value Vth and in the case of the vehicle velocity V being smaller than the threshold value Vth. In FIG. 13, each process step has a reference number of an alphabet "S" followed by a numeral.

In S100, the vehicle control unit 100 acquires signals from the sensors 122, 123, 124, 125, 145, 146, and from the shift switch 47. This allows the vehicle control unit 100 to identify the velocity V, steering wheel angle, steering angle AF, lean angle T, accelerator operation amount, brake operation amount, and driving mode.

In S110, the vehicle control unit 100 determines whether or not a condition (hereinafter referred to as "release condition") is met for operating the steering device 41 in the first mode. In this embodiment, the release condition is that 'the driving mode is "drive" or "neutral," and the velocity V is greater than or equal to the threshold value Vth.' The threshold value Vth is 15 km/h, for example. When the vehicle velocity V is equal to or larger than the threshold value Vth during the vehicle 10 moving forward, the release condition is met.

If the release condition is met (S110: Yes), in S120, the vehicle control unit 100 supplies the steering motor control unit 103 with an instruction for operating the steering device 41 in the first mode. According to the instruction, the steering motor control unit 103 stops the power supply to the steering motor 65 which is intended to maintain the steering angle AF at a target steering angle. This enables the steering device 41 to support the front wheel 12F so that it can turn about the turning axis Ax1 both to the right direction DR side and to the left direction DL side. As a result, the steering angle AF of the front wheel 12F changes following a lean of the vehicle body 90. Furthermore, in this embodiment, the vehicle control unit 100 supplies the steering motor control unit 103 with an instruction for causing the steering motor 65 to apply the turn resistance force between the front wheel 12F and the vehicle body 90. The steering motor control unit 103 supplies power for producing the turn resistance force to the steering motor 65 according to the instruction.

FIGS. 14(A), 14(B) are explanatory diagrams of example maps showing correspondences among the vehicle velocity V, the angular velocity Vt, and a resistance force index value Rf. The horizontal axis represents the vehicle velocity V, and the vertical axis represents the angular velocity Vt. An area represented by the axis of the vehicle velocity V and the axis of the angular velocity Vt (i.e. an area which represents a combination of vehicle velocity V and angular velocity Vt) is divided into a plurality of sub-areas. The sub-areas correspond to respective resistance force index value Rf which are different from each other. The resistance force index value Rf indicates a magnitude of the turn resistance force. The larger the resistance force index value Rf is, the larger the turn resistance force is. It should be noted that Rf=0 indicates that the turn resistance force applied by the steering motor 65 is equal to zero. It should be also noted that electric power to be supplied to the steering motor 65 for producing the turn resistance force is mapped in advance to each resistance force index value Rf. If Rf=0, the electric power to be supplied to the steering motor 65 is equal to zero. Therefore, the front wheel 12F can turn freely about the turning axis Ax1 of the steering device 41.

In S120 (FIG. 13), the vehicle control unit 100 uses a signal from the steering angle sensor 124 to sense a change in the steering angle AF. When the steering angle AF changes, the vehicle control unit 100 references to a predetermined correspondence (e.g. FIG. 14(A)) to identify the resistance force index value Rf mapped to a current combination of vehicle velocity V and angular velocity Vt. The control unit 100 uses a signal from the lean angle sensor 125 (FIG. 12) to calculate the angular velocity Vt. Then, the control unit 100 supplies the steering motor control unit 103 with an instruction for supplying the steering motor 65 with electric power which is mapped to the identified resistance force index value Rf and intended to produce a force in a direction opposite to that of change of the steering angle AF. The steering motor control unit 103 supplies the power to the steering motor 65 according to the instruction. This causes the steering motor 65 to produce the force in the direction opposite to that of change of the steering angle AF. The force to be produced by the steering motor 65 is predetermined to be large enough to reduce the change of the steering angle AF (i.e. the turning of the front wheel 12F) and to be small enough not to change the steering angle AF to the opposite direction. In this manner, the force to be produced by the steering motor 65 does not turn the front wheel 12F but resists the turning of the front wheel 12F (i.e. the change of the steering angle AF).

In the example of FIG. 14(A), the resistance force index value Rf is controlled in two phases of "0" and "1." Specifically, a boundary line BL connecting the axis of the angular velocity Vt and the axis of the vehicle velocity V is predetermined in the correspondence of FIG. 14(A). The boundary line BL is configured so that the angular velocity Vt is decreased with an increase in the vehicle velocity V. The area representing the combination of vehicle velocity V and angular velocity Vt is divided into two sub-areas by this boundary line BL. Among the two sub-areas, a sub-area where the vehicle velocity V and the angular velocity Vt are relatively smaller has Rf=0 while a sub-area where the vehicle velocity V and the angular velocity Vt are relatively larger has Rf=1. If the turn resistance force occurs according to such a correspondence, the turn resistance force is applied when at least one of the vehicle velocity V and the angular velocity Vt is larger. Therefore, the steering angle AF is prevented from changing before the vehicle body 90 leans because the change in the steering angle AF is suppressed by the turn resistance force when the phase of the steering angle AF readily precedes that of the lean angle T as shown in FIGS. 9(B)-9(D). As a result, it is possible to suppress the deterioration in driving stability of the vehicle 10. In addition, the application of turn resistance force is omitted when the vehicle velocity V and the angular velocity Vt are smaller. As a result, the change in the steering angle AF can be prevented from being delayed excessively relative to that in the lean angle T.

Data MP1 (e.g. map data) which represents the correspondence among the vehicle velocity V, the angular velocity Vt, and the resistance force index value Rf as shown in FIG. 14(A) is stored in advance within the non-volatile memory of the vehicle control unit 100. The vehicle control unit 100 references to this data MP1 to identify the resistance force index value Rf mapped to a combination of vehicle velocity V and angular velocity Vt.

In the example of FIG. 14(B), the resistance force index value Rf is controlled in three or more phases (in this example, five phases). Specifically, four boundary lines BL1-BL4 connecting the axis of the angular velocity Vt and the axis of the vehicle velocity V are predetermined in the correspondence of FIG. 14(B). The boundary lines BL1-BL4 is spaced apart from each other, and are configured so that the angular velocity Vt is decreased with an increase in the vehicle velocity V. The area representing the combination of vehicle velocity V and angular velocity Vt is divided into five sub-areas by these boundary lines BL1-BL4. Resistance force index values Rf of 0, 1, 2, 3, 4 are respectively associated with the five sub-areas so that the larger the vehicle velocity V and angular velocity Vt are, the larger the resistance force index value Rf is. In the example of FIG. 14(B), the turn resistance force is adjusted finely according to changes of the vehicle velocity V and angular velocity Vt. As a result, it is possible to further suppress the deterioration in driving stability of the vehicle 10. It should be noted that when the correspondence of FIG. 14(B) is used, data MP2 (e.g. map data) representing this correspondence is used instead of the data MP1 of FIG. 14(A).

The resistance force index value Rf (and thus turn resistance force) may change smoothly according to the vehicle velocity V, or may change smoothly according to the angular velocity Vt. In any event, in S120, the turn resistance force to be applied by the steering motor 65 is modified according to the velocity V and the angular velocity Vt.

In S130 (FIG. 13), the vehicle control unit 100 identifies a first target lean angle T1 mapped to the steering wheel angle. In this embodiment, the first target lean angle T1 is a value obtained by multiplying the steering wheel angle (in degree) by a predetermined coefficient (e.g. 30/60). It should be noted that instead of the proportional relationship, a variety of relationships such that the larger the absolute value of steering wheel angle is, the larger is the absolute value of first target lean angle T1 may be adopted as a correspondence between the steering wheel angle and the first target lean angle T1. Information which represents the correspondence between the steering wheel angle and the first target lean angle T1 is stored in advance within the non-volatile memory of the vehicle control unit 100. The vehicle control unit 100 references to this information to identify the first target lean angle T1 corresponding to the steering wheel angle according to the predetermined correspondence in the referenced information.

It should be noted that as described above, Equation 6 represents the correspondence among the lean angle T, the velocity V, and the turning radius R, and Equation 7 represents the correspondence between the turning radius R and the steering angle AF. These Equations 6 and 7 can be combined to identify the correspondence among the lean angle T, the velocity V, and the steering angle AF. It may be considered that the correspondence between the steering wheel angle and the first target lean angle T1 maps the steering wheel angle to the steering angle AF via the correspondence among the lean angle T, the velocity V, and the steering angle AF (where the steering angle AF can be vary depending upon the velocity V).

The vehicle control unit 100 supplies the lean motor control unit 102 with an instruction for controlling the lean motor 25 so that the lean angle T is equal to the first target lean angle T1. According to the instruction, the lean motor control unit 102 drives the lean motor 25 so that the lean angle T is equal to the first target lean angle T1. This causes the lean angle T of the vehicle 10 to be changed to the first target lean angle T1 mapped to the steering wheel angle. In this manner, the vehicle control unit 100 and the lean motor control unit 102 serve as a lean control unit for controlling the link mechanism 30 and lean motor 25 which lean the vehicle body 90.

In subsequent S140, as described above, the front wheel 12F spontaneously turns to a direction of the steering angle AF calculated based on the turning radius R expressed in Equation 6, and Equation 7. The front wheel 12F begins to spontaneously turn in response to the change in the lean angle T. That is, the steering angle AF changes following a lean of the vehicle body 90. In addition, when the turn resistance force is applied in S120, any steep change in the steering angle AF (in particular, change at a phase preceding the phase of the lean angle T) is suppressed. Then, the process of FIG. 13 ends. The controller 110 repeatedly performs the process of FIG. 13. If the release condition is met, the controller 110 continues to operate the steering device 41 in the first mode, and control the lean angle T in S130. As a result, the vehicle 10 runs toward a traveling direction appropriate to the steering wheel angle.

If the release condition is not met (S110: No), the vehicle control unit 100 proceeds to S160. It should be noted that in this embodiment, any of the following cases does not meet the release condition:
1) the driving mode is "drive" or "neutral," and the velocity V is less than the threshold value Vth;
2) the driving mode is "parking"; and
3) the driving mode is "reverse."

In S160, the vehicle control unit 100 supplies the steering motor control unit 103 with an instruction for operating the steering device 41 in the second mode. In this embodiment, the steering motor control unit 103 supplies power to the steering motor 65 according to the instruction. In this embodiment, the steering motor control unit 103 controls the steering motor 65 so that the steering angle AF is maintained at a target steering angle determined in S180 to be repeated (as described in details later). The front wheel 12F (steering angle AF) is prevented by the steering motor 65 from being free to turn.

In S170, the vehicle control unit 100 identifies the first target lean angle T1 in a similar manner to S130. Then, the vehicle control unit 100 supplies the lean motor control unit 102 with an instruction for controlling the lean motor 25 so that the lean angle T is equal to the first target lean angle T1. According to the instruction, the lean motor control unit 102 drives the lean motor 25 so that the lean angle T is equal to the first target lean angle T1. This causes the lean angle T of the vehicle 10 to be changed to the first target lean angle T1.

It should be noted that in S170, the lean angle T may be controlled so that it becomes a second target lean angle T2 having an absolute value smaller than that of the first target lean angle T1. The second target lean angle T2 may be expressed in Equation 8:

$$T2=(V/Vth)T1 \qquad \text{(Equation 8)}$$

The second target lean angle T2 expressed in Equation 8 changes in proportion to the vehicle velocity V from 0 to the threshold value Vth. The absolute value of the second target lean angle T2 is equal to or smaller than that of the first target lean angle T1. The reason is as follows. During lower velocity, the traveling direction is changed more frequently than during higher velocity. Therefore, during lower velocity, by making the absolute value of the lean angle T smaller, it is possible to drive more stably even if changing the traveling direction frequently. It should be noted that the relationship between the second target lean angle T2 and the vehicle velocity V may be any of a variety of other relationships such that the higher the vehicle velocity V is, the larger the absolute value of the second target lean angle T2 becomes.

In S180 after beginning to change the lean angle T (S170), the vehicle control unit 100 determines a first target steering angle AFt1. The first target steering angle AFt1 is determined based on the steering wheel angle and the vehicle velocity V. In this embodiment, a steering angle AF determined based on the target lean angle identified in S170, and the above Equations 6, 7 is used as the first target steering angle AFt1. Then, the vehicle control unit 100 supplies the steering motor control unit 103 with an instruction for controlling the steering motor 65 so that the steering angle AF is equal to the first target steering angle AFt1. According to the instruction, the steering motor control unit 103 drives the steering motor 65 so that the steering angle AF is equal to the first target steering angle AFt1. This causes the steering angle AF of the vehicle 10 to be changed to the first target steering angle AFt1.

It should be noted that in S180, the steering angle AF may be controlled so that it becomes a second target steering angle AFt2 having an absolute value larger than that of the first target steering angle AFt1. For example, in the case of the equal steering wheel angle, the second target steering angle AFt2 may be determined so that the lower the vehicle velocity V, the larger the absolute value of the second target steering angle AFt2. This configuration allows the minimum turning radius of the vehicle 10 to be reduced when the velocity V is lower. In any event, in the case of the equal vehicle velocity V, the second target steering angle AFt2 is preferably determined so that the larger the absolute value of the steering wheel angle, the larger the absolute value of the second target steering angle AFt2. In addition, when the vehicle velocity V changes between a vehicle velocity V lower than the threshold value Vth and a vehicle velocity V equal to or higher than the threshold value Vth, the steering angle AF and the lean angle T are preferably controlled so that the steering angle AF and the lean angle T change smoothly.

It should be noted that the vehicle control unit 100 begins to turn the front wheel 12F (S180) after the beginning of change in the lean angle T (S170) and before the end of change in the lean angle T (S170). The vehicle control unit 100 may begin to turn the front wheel 12F (S180) after the end of change in the lean angle T (S170).

In response to completion of S170, S180, the process of FIG. 13 ends. The controller 110 repeatedly performs the process of FIG. 13. If the release condition is not met, the controller 110 continues to operate the steering device 41 in the second mode, control the lean angle T in S170, and control the steering angle AF in S180. As a result, the vehicle 10 runs toward a traveling direction appropriate to the steering wheel angle.

The vehicle control unit 100 and the drive device control unit 101 serve as a drive control unit for controlling the electric motors 51L, 51R according to the accelerator operation amount and brake operation amount although not illustrated. In this embodiment, specifically, the vehicle control unit 100 supplies the drive device control unit 101 with an instruction for increasing output power of the electric motors 51L, 51R when the accelerator operation amount is increased. According to the instruction, the drive device control unit 101 controls the electric motors 51L, 51R so as to increase their output power. The vehicle control unit 100 supplies the drive device control unit 101 with an instruction for decreasing output power of the electric motors 51L, 51R when the accelerator operation amount is decreased. According to the instruction, the drive device control unit 101 controls the electric motors 51L, 51R so as to decrease their output power.

The vehicle control unit 100 supplies the drive device control unit 101 with an instruction for decreasing output power of the electric motors 51L, 51R when the brake operation amount becomes larger than zero. According to the instruction, the drive device control unit 101 controls the electric motors 51L, 51R so as to decrease their output power. It should be noted that the vehicle 10 preferably has a brake device which frictionally reduces rotational rate of at least one of all the wheels 12F, 12L, 12R. In addition, the brake device preferably reduces the rotational rate of the at least one wheel when the user steps on the brake pedal 46.

As described above, in this embodiment, when the vehicle velocity V is equal to or larger than the threshold value Vth, the vehicle control unit 100 operates the steering device 41 in the first mode in which the steering angle AF is allowed to change following a lean of the vehicle body 90 (S120), and controls the rear wheel support 80 so that the vehicle body 90 is leaned according to the input to the steering wheel 41a (S130). In addition, the vehicle control unit 100 controls the steering motor 65 through the steering motor control unit 103 to change the turn resistance force acting between the vehicle body 90 and the front wheel 12F. It is possible to control a change in the steering angle AF by changing the turn resistance force, and thus it is possible to suppress deterioration in driving stability of the vehicle 10 due to a change in the steering angle AF.

The concrete description is as follows. When at least one of the vehicle velocity V and the angular velocity Vt is larger, and specifically when the resistance force index value Rf of larger than zero is associated with the combination of vehicle velocity V and angular velocity Vt (FIG. 14(A), FIG. 14(B)), the vehicle control unit 100 causes the steering motor 65 to produce the turn resistance force. When both of the vehicle velocity V and the angular velocity Vt is smaller, and specifically when the resistance force index value Rf of zero is associated with the combination of vehicle velocity V and angular velocity Vt (FIG. 14(A), FIG. 14(B)), the vehicle control unit 100 allows the front wheel 12F to turn freely without causing the steering motor 65 to produce the turn resistance force. In this manner, the movement of the steering angle AF is prevented from preceding the phase of the lean angle T because the turn resistance force is applied between the front wheel 12F and the vehicle body 90 when the phase of the steering angle AF readily precedes that of the lean angle T. In addition, the application of turn resistance force is omitted when the vehicle velocity V and the angular velocity Vt are smaller. As a result, the change in the steering angle AF can be prevented from being delayed excessively relative to that in the lean angle T. In this manner, it is possible to suppress deterioration in driving stability of the vehicle 10 with a variety of combinations of vehicle velocity V and angular velocity Vt because the turn resistance force is changed according to the vehicle velocity V and the angular velocity Vt. It should be noted that the vehicle control unit 100, the steering motor control unit 103, and the steering motor 65 as a whole is an example of changing device which changes the turn resistance force acting between the vehicle body 90 and the front wheel 12F as a steered wheel.

In addition, as shown in FIG. 14(A), FIG. 14(B), when the angular velocity Vt is fixed, the vehicle control unit 100 makes the turn resistance force in the case of a higher vehicle velocity V larger than that in the case of a lower vehicle velocity V. Therefore, it is possible to suppress deterioration in driving stability of the vehicle 10 in the case of a higher vehicle velocity V because the phase of the steering angle AF is prevented from preceding that of the lean angle T in the case of the higher vehicle velocity V.

In addition, as shown in FIG. 14(A), FIG. 14(B), when the vehicle velocity V is fixed, the vehicle control unit 100 makes the turn resistance force in the case of a higher angular velocity Vt larger than that in the case of a lower angular velocity Vt. Therefore, it is possible to suppress deterioration in driving stability of the vehicle 10 in the case of a higher angular velocity Vt because the phase of the steering angle AF is prevented from preceding that of the lean angle T in the case of the higher angular velocity Vt.

B. Other Embodiments of Control of Turn Resistance Force

Figure 14:
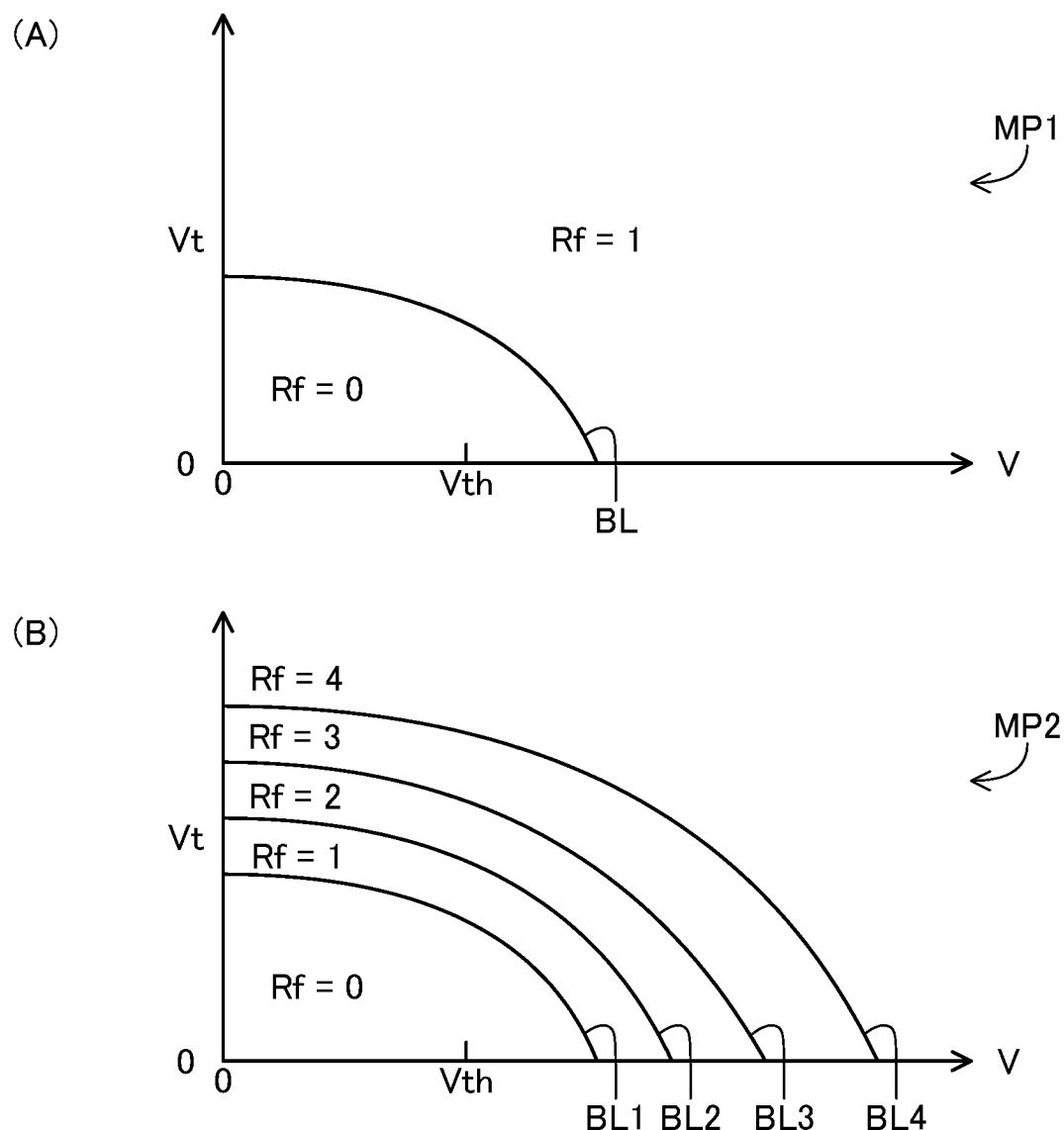
FIG. 14(A)-14(B) are explanatory diagrams of example maps showing correspondences among a vehicle velocity V, an angular velocity Vt, and a resistance force index value Rf.
Figure 15:
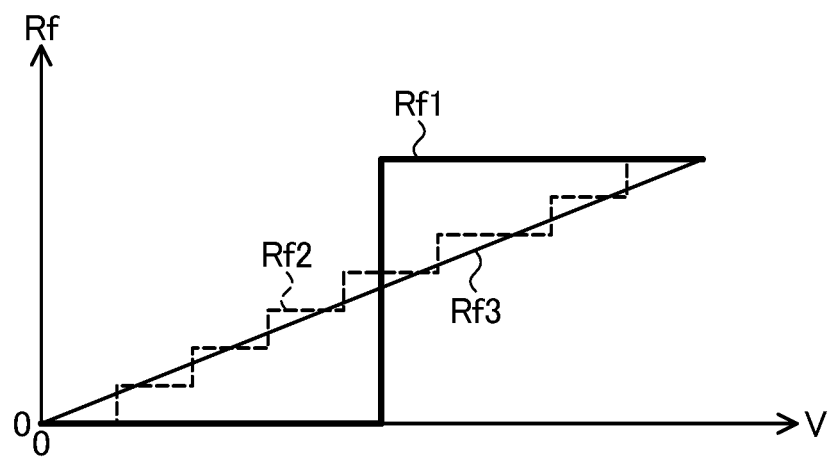
FIG. 15 is graphs showing other embodiments of control of turn resistance force.
Figure 16:
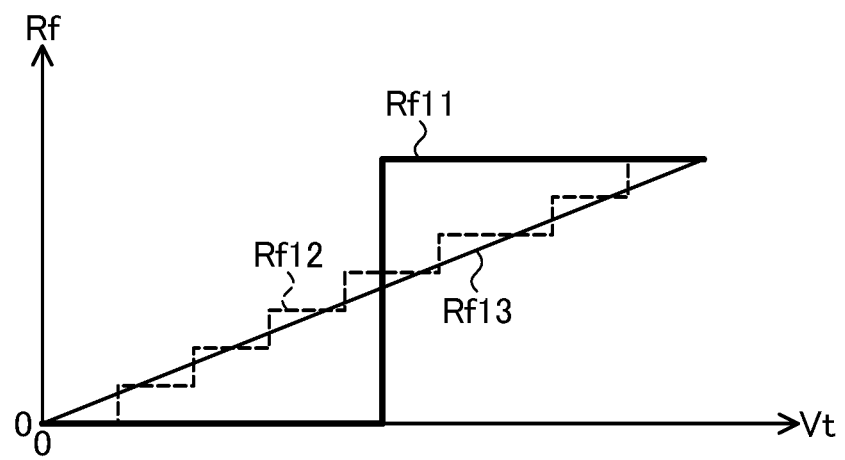
FIG. 16 is graphs showing other embodiments of control of turn resistance force.

FIG. 15, FIG. 16 are graphs showing other embodiments of control of turn resistance force. FIG. 15 shows a graph illustrating correspondences between the vehicle velocity V and the resistance force index value Rf. The horizontal axis represents the vehicle velocity V, and the vertical axis represents the resistance force index value Rf. This figure shows three plots Rf1-Rf3 representing three embodiments. The correspondences between the vehicle velocity V and the resistance force index value Rf represented by these plots Rf1-Rf3 may be used instead of the correspondences in FIG. 14(A), FIG. 14(B).

In the first plot Rf1, the resistance force index value Rf is controlled in two phases including 0. In the second plot Rf2, the resistance force index value Rf is controlled in three or more phases including 0. In both of the plots Rf1, Rf2, the resistance force index value Rf is increased in a stepwise manner with an increase in the vehicle velocity V. In the third plot Rf3, the resistance force index value Rf is increased smoothly with an increase in the vehicle velocity V. In all of the three plots Rf1-Rf3, the resistance force index value Rf at a higher vehicle velocity V is larger than the resistance force index value Rf at a lower vehicle velocity V. Therefore, it is possible to suppress deterioration in driving stability of the vehicle 10 in the case of a higher vehicle velocity V because the phase of the steering angle AF is prevented from preceding that of the lean angle T in the case of the higher vehicle velocity V. It should be noted that the resistance force index value Rf is independent of the angular velocity Vt. In this manner, the resistance force index value Rf may be controlled according to the vehicle velocity V independently of the angular velocity Vt.

FIG. 16 shows a graph illustrating correspondences between the angular velocity Vt and the resistance force index value Rf. The horizontal axis represents the angular velocity Vt, and the vertical axis represents the resistance force index value Rf. This figure shows three plots Rf11-Rf13 representing three embodiments. The correspondences between the angular velocity Vt and the resistance force index value Rf represented by these plots Rf11-Rf13 may be used instead of the correspondences in FIG. 14(A), FIG. 14(B).

In the first plot Rf11, the resistance force index value Rf is controlled in two phases including 0. In the second plot Rf12, the resistance force index value Rf is controlled in three or more phases including 0. In both of the plots Rf11, Rf12, the resistance force index value Rf is increased in a stepwise manner with an increase in the angular velocity Vt. In the third plot Rf13, the resistance force index value Rf is increased smoothly with an increase in the angular velocity Vt. In all of the three plots Rf11-Rf13, the resistance force index value Rf at a higher angular velocity Vt is larger than the resistance force index value Rf at a lower angular velocity Vt. Therefore, it is possible to suppress deterioration in driving stability of the vehicle 10 in the case of a higher angular velocity Vt because the phase of the steering angle AF is prevented from preceding that of the lean angle T in the case of the higher angular velocity Vt. It should be noted that the resistance force index value Rf is independent of the vehicle velocity V. In this manner, the resistance force index value Rf may be controlled according to the angular velocity Vt independently of the vehicle velocity V.

In any event, data which represents correspondences between the resistance force index value Rf and another information (e.g. at least one of the vehicle velocity V and the angular velocity Vt) is stored in advance within the non-volatile memory of the vehicle control unit 100. The vehicle control unit 100 references to the data to identify the resistance force index value Rf based on at least one of the vehicle velocity V and the angular velocity Vt.

Figure 17:
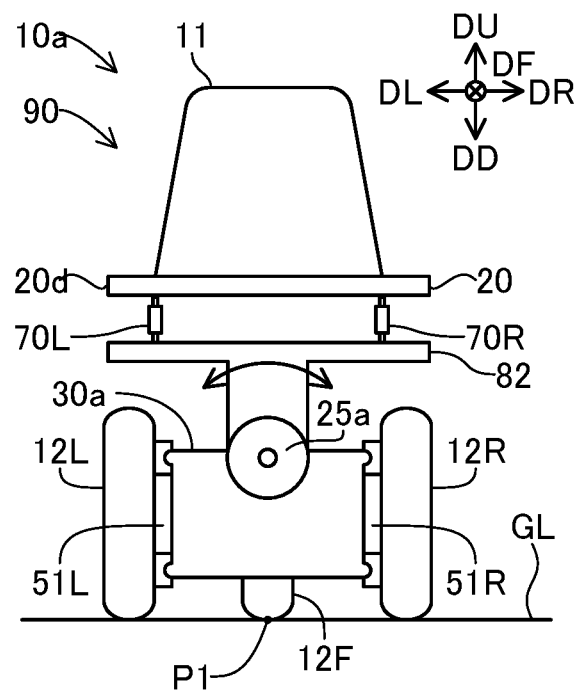
FIG. 17 is a schematic diagram showing another embodiment of vehicle.

C. Modifications (1) As the configuration of lean mechanism which leans the vehicle body 90 in its width direction, a variety of other configurations may be employed instead of the configuration including the link mechanism 30 (FIG. 4). FIG. 17 is a schematic diagram showing another embodiment of vehicle. The vehicle 10a of FIG. 17 is obtained by substituting the link mechanism 30 of the vehicle 10 illustrated in FIG. 4 etc. with a motor pedestal 30a. Each of the motors 51L, 51R of the rear wheel 12L, 12R is secured to the motor pedestal 30a. In addition, the lean motor 25a can rotate the first support portion 82 to each of the right direction DR and the left direction DL relative to the motor pedestal 30a. This enables the vehicle body 90 to lean to each of the right direction DR and the left direction DL. The rear wheel 12L, 12R stand upright relative to the ground GL without being tilted, whether or not the vehicle body 90 leans. In this manner, as a lean mechanism, a configuration may be employed that includes the pedestal 30a to which the wheels 12L, 12R are secured, the member 82 which supports the vehicle body 90, and the lean motor 25a which tilts the member 82 relative to the pedestal 30a. In addition, the drive device of the lean mechanism may be another type of drive device instead of the electric motor. For example, the lean mechanism may be driven by fluid pressure (e.g. oil pressure) from a pump. For example, each of the pair of wheels 12L, 12R (FIG. 5(B)) may be attached to the member 82 supporting the vehicle body 90 so that it can slide vertically, and the relative position of the pair of wheels 12L, 12R in a direction perpendicular to the rotational axis may be changed by a first hydraulic cylinder coupling the member 82 to the wheel 12L and a second hydraulic cylinder coupling the member 82 to the wheel 12R. In addition, the member 82 supporting the vehicle body 90 (FIG. 17) may be attached to the pedestal 30a so that it can rotate to right and left, and the orientation of the member 82 relative to the pedestal 30a may be changed by a hydraulic cylinder coupling the pedestal 30a to the member 82. In general, it is possible to employ a variety of configurations which can tilt the vehicle body 90 relative to the ground GL. It is preferable to employ a mechanism which can maintain the lean angle T of the vehicle body 90 at a target lean angle, in contrast to a simple suspension.

In addition, the lean control unit which controls the lean mechanism in response to an input into an operation input unit (e.g. steering wheel 41a) may be an electric circuit including a computer as the vehicle control unit 100 and the lean motor control unit 102 described above with regard to FIG. 12. Instead, an electric circuit including no computer may control the lean mechanism in response to an input into the operation input unit so that the lean angle T becomes a target lean angle.

(2) As the changing device which changes a turn resistance force acting between a vehicle body and a steered wheel (e.g. front wheel 12F), any device which can change a turn resistance force between a vehicle body and a steered wheel may be employed instead of the device including the vehicle control unit 100, the steering motor control unit 103, and the steering motor 65. In general, the steering device which supports the steered wheel includes a member (hereinafter referred to as "wheel side member") which supports the steered wheel and turns about the turning axis along with the steered wheel. For example, the steering device 41 of FIG. 1 includes the front fork 17, and the front fork 17 supports the front wheel 12F, and turns about the turning axis Ax1 along with the front wheel 12F (the front fork 17 is an example of the wheel side member). A steering damper for applying a damping force may be connected to the vehicle body or a portion of the steering device, the portion being secured to the vehicle body, and to the wheel side member. For example, a steering damper may be connected to the front portion 20a of the main body 20 and to the front fork 17 shown in FIG. 1. The steering damper applies a damping force against turning of the wheel side member relative to the vehicle body. This damping force suppresses the turning of the wheel side member, and is an example of the turn resistance force. The vehicle control unit 100 can adjust the turn resistance force by adjusting the damping force of the steering damper (the larger the damping force is, the larger the turn resistance force is).

Alternatively, a brake (e.g. friction brake) which produces a braking force against turning of the wheel side member may be secured to the vehicle body or to a portion of the steering device, the portion being secured to the vehicle body, and an actuator (e.g. motor) for the brake may be connected to the brake. The braking force suppresses the turning of the wheel side member, and is an example of the turn resistance force. The vehicle control unit 100 can adjust the braking force due to the brake (and thus the turn resistance force) by controlling the actuator. As the actuator for the brake, any actuator which can actuate the brake may be employed instead of the motor. For example, a centrifugal clutch may be employed that coupled to the brake and to one (e.g. steered wheel) of the plurality of wheels. The centrifugal clutch can engage to transmit a drive force from the rotating wheel to the brake. The centrifugal clutch engages more strongly with an increase in the rotational rate of the wheel, i.e. vehicle velocity V. Therefore, the drive force to be transmitted to the brake is increased with an increase in vehicle velocity V. The brake produces the greater braking force with an increase in the drive force, i.e. vehicle velocity V. If the centrifugal clutch is used, the control unit (e.g. vehicle control unit 100) for controlling the turn resistance force may be omitted.

In any event, the changing device preferably changes the turn resistance force according to at least one of the vehicle velocity V and the angular velocity Vt as in each embodiment of FIGS. 14-16.

(3) As the correspondence between the parameter (e.g. at least one of the vehicle velocity V and the angular velocity Vt) used to adjust the turn resistance force and the turn resistance force, a variety of other correspondences may be employed instead of the correspondence in each embodiment of FIGS. 14-16. For example, the turn resistance force (e.g. resistance force index value Rf) may change in a curved manner with the change in vehicle velocity V. Alternatively, the turn resistance force (e.g. resistance force index value Rf) may change in a curved manner with the change in angular velocity Vt.

In any event, when the turn resistance force changes according to the vehicle velocity V, it is preferable to control the turn resistance force at its minimum value within a lower velocity range of the vehicle velocity V including zero. The minimum value of the turn resistance force is a minimum value within a range over which the changing device of the turn resistance force can change (e.g. the turn resistance force applied by the changing device for changing the turn resistance force is equal to zero). As described above with regard to FIG. 8, FIG. 9, when the vehicle velocity V is lower, the first torque tqa is smaller, and thus the phase of the steering angle AF is readily delayed relative to that of the lean angle T. The minimum turn resistance force can suppress the delay in the phase of the steering angle AF. Alternatively, when the turn resistance force changes according to the angular velocity Vt, it is preferable to control the turn resistance force at its minimum value within a lower angular velocity range of the angular velocity Vt including zero. As described above with regard to FIG. 8, FIG. 9, when the angular velocity Vt is lower, the first torque tqa is smaller, and thus the phase of the steering angle AF is readily delayed relative to that of the lean angle T. The minimum turn resistance force can suppress the delay in the phase of the steering angle AF.

(4) In order to suppress deterioration in driving stability of the vehicle body 90, it is preferable that the phase delay of the steering angle AF described above with regard to FIG. 9 is smaller. A variety of methods may be employed in order to reduce the phase delay. It is possible to employ any one or more of the following methods B1-B5, for example.

B1: Increase an inertia moment of the front wheel 12F which rotates about the rotational axis Ax2 (FIG. 8)

B2: Decrease an inertia moment of a member (e.g. front fork 17) which turns about the turning axis Ax1 of the steering device 41 along with the front wheel 12F B3: Decrease a resistance (e.g. friction, damping force of a steering damper) to turning about the turning axis Ax1 of the steering device 41

B4: Increase the trail Lt (FIG. 1)

B5: Decrease an inertia moment (sometimes referred to as yaw moment) relating to a turn of the vehicle 10

(5) In the above embodiments, the state of the front wheel 12F which is a steered wheel is switched according to the vehicle velocity V between the first state in which the steering angle AF is allowed to change following a lean of the vehicle body 90 (FIG. 13: S120, S140) and the second state in which the steering angle AF changes according to an input into the operation input unit (e.g. steering wheel 41a) (FIG. 13: S160, S180). The vehicle control unit 100 and the steering motor control unit 103 which control the operation mode of the steering device 41, and the steering device 41 as a whole are an example of steered wheel support unit which supports the steered wheel, and can switch the state of the steered wheel between the first and second states. A variety of other configurations may be employed as a configuration of the steered wheel support unit. For example, the steering motor 65 may be omitted, and the steering wheel 41a and the front fork 17 may be connected via a clutch instead. When the clutch is disengaged, the state of the front wheel 12F is the first state. When the clutch is engaged, the state of the front wheel 12F is the second state. In this case, the steering device, which includes the clutch, and a switching unit, which switches the state of the clutch according to the vehicle velocity V, as a whole are an example of the steered wheel support unit. The switching unit for the clutch may be configured as an electric circuit, for example. In any event, an electric circuit including no computer may change the state of the drive wheel according to the vehicle velocity V. It should be noted that if the steering motor 65 is omitted, another device (e.g. steering damper or brake, etc.) which applies the turn resistance force between the vehicle body and the steered wheel is provided in the vehicle.

It should be noted that the switching of the state of the steered wheel may be omitted, and the steered wheel support unit may be configured to support the drive wheel only in the first state. For example, the steering motor 65 may be omitted, and the front fork 17 and the steering wheel 41a may be connected via an elastic body (e.g. torsion bar spring, coil spring, rubber) instead. In this case, the steering angle AF of the front wheel 12F is changed by changing the steering wheel angle of the steering wheel 41a. The user can adjust the steering angle AF to his/her desired angle by handling the steering wheel 41a. In addition, if the steering wheel angle is maintained at a constant value, the direction of the front wheel 12F (steering angle AF) can be changed through a deformation of the elastic body. Therefore, the steering angle AF can change following a lean of the vehicle body 90. In this manner, a configuration may be employed that includes the elastic body connecting the operation input unit (e.g. steering wheel 41a) and the steered wheel (e.g. front wheel 12F). It should be noted that when the switching of the state of the steered wheel is omitted, the steered wheel support unit does not include the control unit for switching the state of the steered wheel, but may be configured with a steering device supporting the steered wheel (e.g. steering device including an elastic body).

In general, the steered wheel support unit may be a device which supports the steered wheel while the steering angle of the steered wheel changes following a lean of the vehicle body, independently of the vehicle velocity V. The steered wheel support unit may be also a device which allows the steering angle of the steered wheel to change following a lean of the vehicle body within a particular partial range of the vehicle velocity V, and changes the steering angle according to an input into the operation input unit when the vehicle velocity V is out of the particular range. For example, the steered wheel support unit may be a device which supports the steered wheel in an operation mode corresponding to the vehicle velocity V from among a plurality of operation modes. The plurality of operation modes include an operation mode for allowing the steering angle of the steered wheel to change following a lean of the vehicle body, and an operation mode for changing the steering angle according to an input into the operation input unit. At least when the vehicle velocity V is within the particular range described above, the vehicle body is preferably leaned by the lean mechanism according to an input into the operation input unit. For example, the lean control unit which controls the lean mechanism preferably controls the lean mechanism so that the lean angle T becomes a target lean angle mapped to the input into the operation input unit. A range of the vehicle velocity V over which the vehicle body is leaned by the lean mechanism may be a partial range of the vehicle velocity V or the overall range of the vehicle velocity V.

In any event, in order to suppress deterioration in driving stability of the vehicle due to a change in the steering angle, the vehicle preferably includes the changing device which changes the turn resistance force acting between the vehicle body and the steered wheel.

(6) As the method of controlling the vehicle, a variety of other methods may be employed instead of the method described above with regard to FIG. 13. For example, the steering device 41 may operate in the first mode independently of the vehicle velocity V. Accordingly, the second mode may be omitted. For example, S120, S140, S160, S180 of FIG. 13 may be omitted. Thus, the above-mentioned steered wheel support unit may be employed that is configured to support the drive wheel only in the first state, and the steering motor control unit 103 (FIG. 12) and the steering motor 65 may be omitted.

(7) As the configuration of vehicle, a variety of other configurations may be employed instead of the above-described configurations. For example, the computer such as the controller 110 (FIG. 12) may be omitted. For example, an electric circuit including no computer may control the motors 51R, 51L, 25, 65 in response to signals from the sensors 122, 123, 124, 125, 145, 146, and the switch 47. Alternatively, a machine which operates using a drive force of hydraulic pressure or motor may control the motors 51R, 51L, 25, 65 instead of the electric circuit. In addition, a variety of configurations may be employed as the total number and arrangement of the plurality of wheels. For example, there may be two front wheels in total and one rear wheel in total. Alternatively, there may be two front wheels in total and two rear wheels in total. Furthermore, a pair of wheels spaced apart from each other in the width direction may be steered wheels. The rear wheels may be steered wheels. The drive wheel may be the front wheel. In any event, the vehicle preferably includes three or more wheels, including a pair of wheels spaced apart from each other in the width direction of the vehicle and a steered wheel(s) constituted by the pair of wheels or another wheel(s). In addition, the three or more wheels of the vehicle preferably include a front wheel(s) and a rear wheel(s) disposed in the back direction DB side of the front wheel. This configuration enables the vehicle to self-stand when it is stopped. In addition, the steered wheel preferably has a positive trail Lt. This allows the steering angle of the steered wheel can readily change following a lean of the vehicle body. The drive device for driving the drive wheel may be any device which rotates the wheel (e.g. internal combustion engine) instead of the electric motor. Alternatively, the drive device may be omitted. That is, the vehicle may be a human-powered vehicle. In this case, the lean mechanism may be a human-powered lean mechanism which operates in response to handling of the operation input unit. In addition, the maximum riding capacity of the vehicle may be two or more persons instead of one person.

(8) In each embodiment described above, some of the components which are achieved by hardware may be substituted with software while some or all of the components which are achieved by software may be substituted with hardware. For example, the function of the vehicle control unit 100 in FIG. 12 may be achieved by a dedicated hardware circuitry.

In addition, if some or all of the functions of the present invention are achieved by a computer program, the program can be provided in the form of a computer-readable storage medium (e.g. non-transitory storage medium) having the program stored therein. The program can be used while being stored in a storage medium (computer-readable storage medium) which is the same as or different from the provided storage medium. The "computer-readable storage medium" is not limited to a portable storage medium such as memory card or CD-ROM, but may also include an internal storage within the computer such as various types of ROM, and an external storage connected to the computer such as hard disk drive.

The present invention has been described above with reference to the embodiments and the modifications although the above-described embodiments are intended to facilitate the understanding of the invention, but not to limit the invention. The present invention may be modified or improved without departing from the spirit and scope of the claims, and includes its equivalents.

INDUSTRIAL APPLICABILITY

The present invention can be preferably used for a vehicle.

DESCRIPTION OF THE REFERENCES 10, 10a vehicle
11 seat 12F front wheel
12L left rear wheel (drive wheel)
12R right rear wheel (drive wheel)
12Fc gravity center 12La, 12Ra wheel
12Lb, 12Rb tire
17 front fork
20 main body
20a front portion
20b bottom portion
20c rear portion
20d support portion
25, 25a lean motor
30 link mechanism
33L left longitudinal link member
21 center longitudinal link member
33R right longitudinal link member
31D lower lateral link member
31U upper lateral link member
30a motor pedestal
41 steering device
41a steering wheel
41ax supporting rod
45 accelerator pedal
46 brake pedal
47 switch
47 shift switch
51L left electric motor
51R right electric motor
65 steering motor
70 suspension system
70L left suspension
70R right suspension
70La, 70Ra central axis
75 connector
80 rear wheel support
82 first support portion
83 second support portion
90 vehicle body
90c gravity center
91 lower portion
100 vehicle control unit
101 drive device control unit
102 lean motor control unit
103 steering motor control unit
110 controller
120 battery
122 vehicle velocity sensor
123 steering wheel angle sensor
124 steering angle sensor
125 lean angle sensor
145 accelerator pedal sensor
146 brake pedal sensor
147 shift switch
V velocity (vehicle velocity)
T lean angle
Vt angular velocity
At angular acceleration
R turning radius
m mass
P1 contact point
P2 intersection point
AF steering angle
GL ground
Cr turning center
Lt trail
Ax1 turning axis
Ax2 rotational axis
Ax3 front axis
AxL lean axis
AxR roll axis
DF front direction
DB back direction
DU upward direction
DD downward direction
DL left direction
DR right direction

The invention claimed is:

1. A vehicle comprising:
a vehicle body;
three or more wheels including a pair of wheels spaced apart from each other in a width direction of the vehicle and a steered wheel constituted by the pair of wheels or another wheel, the steered wheel being turnable to right and left relative to the vehicle body, the steered wheel being configured so that an intersection point between turning axis of the steered wheel and a ground is located in front of a center of contact surface between the steered wheel and the ground;
an operation input unit to be operated to input a turning direction; and
a lean mechanism configured to lean the vehicle body in the width direction,
wherein within at least partial range of vehicle velocity, the vehicle is configured to travel in a mode in which the vehicle body is leaned by the lean mechanism according to an input into the operation input unit, and a steering angle of the steered wheel changes following a lean of the vehicle body,
the vehicle comprises a changing device configured to change a turn resistance force acting between the vehicle body and the steered wheel, and
when the vehicle velocity is higher, the changing device makes the turn resistance force larger than the turn resistance force when the vehicle velocity is lower.

2. The vehicle of claim 1,
wherein when an angular velocity at which the lean mechanism leans the vehicle body is higher, the changing device makes the turn resistance force larger than the turn resistance force when the angular velocity is lower.

* * * * *